United States Patent
Sugita et al.

(10) Patent No.: US 10,253,196 B2
(45) Date of Patent: Apr. 9, 2019

(54) INKJET RECORDING INK COMPOSITION, METHOD FOR PRODUCING THE SAME, AND INKJET RECORDING METHOD

(71) Applicant: DNP FINE CHEMICALS CO., LTD., Kanagawa (JP)

(72) Inventors: Yukio Sugita, Kanagawa (JP); Fumie Yamazaki, Kanagawa (JP); Masaki Inumaru, Kanagawa (JP); Kisei Matsumoto, Kanagawa (JP); Naoki Shiraishi, Kanagawa (JP)

(73) Assignee: DNP FINE CHEMICALS CO., LTD., Kanagawa (JP)

( * ) Notice: Subject to any disclaimer, the term of this patent is extended or adjusted under 35 U.S.C. 154(b) by 85 days.

(21) Appl. No.: 15/039,685

(22) PCT Filed: Sep. 2, 2014

(86) PCT No.: PCT/JP2014/073019
§ 371 (c)(1),
(2) Date: May 26, 2016

(87) PCT Pub. No.: WO2015/079761
PCT Pub. Date: Jun. 4, 2015

(65) Prior Publication Data
US 2016/0376452 A1    Dec. 29, 2016

(30) Foreign Application Priority Data
Nov. 27, 2013 (JP) .................. 2013-245262

(51) Int. Cl.
| B41J 2/01 | (2006.01) |
| C09D 11/107 | (2014.01) |
| C09D 11/322 | (2014.01) |
| C09D 11/38 | (2014.01) |
| C09D 11/023 | (2014.01) |
| C09D 11/36 | (2014.01) |

(52) U.S. Cl.
CPC .............. *C09D 11/107* (2013.01); *B41J 2/01* (2013.01); *C09D 11/023* (2013.01); *C09D 11/322* (2013.01); *C09D 11/36* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| 5,750,592 | A | 5/1998 | Shinozuka et al. | |
| 2005/0165159 | A1* | 7/2005 | Ogura | ............... C08G 18/6254 524/560 |
| 2005/0250876 | A1 | 11/2005 | Kawaguchi et al. | |
| 2008/0213550 | A1* | 9/2008 | Watanabe | ............ B41M 7/0072 428/195.1 |
| 2009/0088500 | A1 | 4/2009 | Nishimoto et al. | |
| 2010/0056679 | A1 | 3/2010 | Shiotani et al. | |
| 2013/0187998 | A1 | 7/2013 | Ohmoto | |
| 2014/0055520 | A1 | 2/2014 | Inumaru et al. | |
| 2015/0197648 | A1* | 7/2015 | Watanabe | ............... C09D 11/36 524/32 |

FOREIGN PATENT DOCUMENTS

| EP | 1724311 A1 | 11/2006 |
| JP | 07-82516 A | 3/1995 |
| JP | 11-323226 A | 11/1999 |
| JP | 2002-294105 A | 10/2002 |
| JP | 2003-160748 A | 6/2003 |
| JP | 2006-070105 A | 3/2006 |
| JP | 2006-348256 A | 12/2006 |
| JP | 2009-209316 A | 9/2009 |
| JP | 2009-221252 A | 10/2009 |
| JP | 2009-235323 A | 10/2009 |
| JP | 2011-012226 A | 1/2011 |
| JP | 2012-051357 A | 3/2012 |
| JP | 2012-136573 A | 7/2012 |
| JP | 2013-158934 A | 8/2013 |
| JP | 2013-166364 A | 8/2013 |
| WO | 2007/108382 A1 | 9/2007 |
| WO | 2008/120490 A1 | 10/2008 |

OTHER PUBLICATIONS

Huntsman, Monomethylethanolamine Technical Bulletin, 2007, p. 1-2.*
International Search Report dated Sep. 30, 2014; PCT/JP2014/073019.

* cited by examiner

Primary Examiner — Manish S Shah
(74) Attorney, Agent, or Firm — Ladas & Parry LLP

(57) ABSTRACT

Provided is an inkjet recording ink composition which has excellent water resistance and solvent resistance and also has excellent ejection stability. Disclosed is an inkjet recording ink composition which contains a resin having an acid value of less than 10 mg KOH/g, an amino alcohol having a boiling point of 100° C. or more and 300° C. or less, a pigment, and a solvent, in which the resin is in an emulsion state.

16 Claims, No Drawings

INKJET RECORDING INK COMPOSITION, METHOD FOR PRODUCING THE SAME, AND INKJET RECORDING METHOD

TECHNICAL FIELD

The present invention relates to an inkjet recording ink composition, a method for producing the same, and an inkjet recording method.

BACKGROUND ART

Recently, provision of print materials of various kinds and small lots is under progress, and attention is drawn to, as a substitute for off-set printing of a conventional art, inkjet printing which is on-demand printing made easy to respond to high speed printing.

The inkjet printing is a printing method in which ink droplets ejected from a printer head are landed on a recording medium, infiltrated and fixed to form dots, and in accordance with gathering of many of the dots, an image is formed. This process of forming dots is critical for forming a clear image.

Uncoated papers such as high quality paper and common paper generally used as a recording medium has a large amount of hydroxyl groups of cellulose, and thus it is hydrophilic and exhibits a swelling property according to absorption of water. From this point of view, an aqueous ink is generally used as an ink.

Meanwhile, coated papers such as coat paper, art paper, and cast paper are used for a printed materials such as calendar, poster, and color pages of a magazine for which high-level reproducibility is required, and a coating layer is formed by coating a paper substrate surface with a solution (coating solution) which has a binder and a white pigment containing kaolin or calcium carbonate as a main component dispersed in water. As the binder, synthetic latex is mainly used, for example, and a hydrophobic coating layer is formed by filling spaces among pigment particles. For such reasons, when printing is made on coated paper by using a general aqueous ink, the ink does not easily infiltrate the recording medium compared to uncoated paper. Thus, there was a problem that, as the ink is repelled on a surface of coated paper and it cannot be applied homogeneously, the printed material tends to have insufficient water resistance or solvent resistance.

Accordingly, blending a resin emulsion as a fixing agent in an aqueous ink is known, for example. However, even when a resin emulsion is used, according to a known technique of a conventional art, the printed material has insufficient water resistance or solvent resistance.

Furthermore, when a resin emulsion is contained, there is a case in which ejection stability like continuous ejection property or intermittent ejection property is impaired if the emulsion has insufficient stability. In accordance with the enhancement in density and resolution of an inkjet head, and the increase in printing speed, due to development of an inkjet technique in recent years, it has been a subject to ensure ejection reliability.

Conventionally, for synthesis of a resin emulsion, inorganic salts like sodium hydroxide or ammonia is used as a neutralizing agent to ensure the dispersion stability of a resin in a solvent or the solvent affinity of a resin (for example, Patent Literature 1). However, when inorganic salts are used, members of an inkjet printer may be corroded, and ammonia has a problem in terms of storage stability as it has high volatility.

Meanwhile, as an aqueous ink containing amino alcohol, an ink composition which contains a pigment coated with water insoluble resin, an amino alcohol, a water soluble organic solvent, water, and resin fine particles in an amount of 5% by mass or more is disclosed in, for example, Patent Literature 2. For improvement of wiping property during drying and solidifying, an amino alcohol is used in Patent Literature 2. According to Patent Literature 2, it is preferably considered that use of a water insoluble resin having an acid value of 30 mg KOH/g or more is preferred in terms of pigment dispersion property and storage stability.

However, there is still a problem that, even when such an aqueous ink is used for coated paper, a printed material exhibiting sufficient water resistance or solvent resistance cannot be produced. In addition, for use in an inkjet mode, it is required for an ink to have good ejection stability.

CITATION LIST

Patent Literature

Patent Literature 1: JP 2009-235323 A
Patent Literature 2: JP 2009-221252 A

SUMMARY OF INVENTION

Technical Problem

The present invention was achieved under the circumstances described above, and an object of the present invention is to provide an inkjet recording ink composition which has excellent water resistance and solvent resistance and also excellent storage stability and ejection stability, a method for producing the composition, and an inkjet recording method using the inkjet recording ink composition.

Solution to Problem

To achieve the above object, inventors of the present invention made diligent research and have found that, by using in combination an amino alcohol having a specific boiling point with a resin having a low acid value, a printed material with excellent water resistance and solvent resistance can be produced and an ink composition with excellent storage stability and ejection stability can be provided.

An inkjet recording ink composition according to a first embodiment of the present invention includes: a resin having an acid value of less than 10 mg KOH/g; an amino alcohol having a boiling point of 100° C. or more and 300° C. or less; a pigment; and a solvent, wherein the resin is in an emulsion state.

An inkjet recording ink composition according to a second embodiment of the present invention includes: a resin having an acid value of less than 10 mg KOH/g; an amino alcohol having a boiling point of 100° C. or more and 300° C. or less; a pigment; and a solvent, wherein at least part of acidic groups contained in the resin are neutralized by the amino alcohol; and the resin is in an emulsion state.

A method for producing an inkjet recording ink composition according to the present invention is a method for producing an inkjet recording ink composition, wherein the inkjet recording ink composition contains a resin having an acid value of less than 10 mg KOH/g, an amino alcohol having a boiling point of 100° C. or more and 300° C. or less, a pigment, and a solvent, and wherein the resin is in an emulsion state, wherein the method includes the steps of: preparing the resin emulsion by neutralizing at least part of acidic groups contained in the resin by the amino alcohol; and mixing the resin emulsion, the pigment, and the solvent.

An inkjet recording method according to the present invention includes: printing by an inkjet method using the inkjet recording ink composition according to the present invention, or the inkjet recording ink composition produced by the method for producing the inkjet recording ink composition according to the present invention.

Advantageous Effects of Invention

According to the present invention, an inkjet recording ink composition with excellent water resistance and solvent resistance and also excellent storage stability and ejection stability, a method for producing it, and an inkjet recording method using the inkjet recording ink composition can be provided.

DESCRIPTION OF EMBODIMENTS

Hereinbelow, detailed descriptions are given for an inkjet recording ink composition, a method for producing it, and an inkjet method according to the present invention in order.

Incidentally, in the present invention, "(meth)acrylic" means any one of acrylic and methacrylic, and "(meth) acrylate" means any one of acrylate and methacrylate.

[Inkjet Recording Ink Composition]

The inkjet recording ink composition according to a first embodiment of the present invention contains a resin having an acid value of less than 10 mg KOH/g, an amino alcohol having a boiling point of 100° C. or more and 300° C. or less, a pigment, and a solvent, wherein the resin is in an emulsion state.

The inkjet recording ink composition according to a second embodiment of the present invention contains a resin having an acid value of less than 10 mg KOH/g, an amino alcohol having a boiling point of 100° C. or more and 300° C. or less, a pigment, and a solvent, wherein at least part of acidic groups contained in the resin are neutralized by the amino alcohol so that the resin is in an emulsion state.

Incidentally, the resin having an acid value of less than 10 mg KOH/g in the inkjet recording ink composition of the second embodiment indicates a resin in which the resin before neutralization by amino alcohol has an acid value of less than 10 mg KOH/g, and it is the same as the resin having an acid value of less than 10 mg KOH/g in the inkjet recording ink composition of the first embodiment.

As a specific amino alcohol is used in combination with a resin having a low acid value, which is in an emulsion state in an ink composition, the inkjet recording ink composition according to the present invention has excellent water resistance and solvent resistance and also has excellent storage stability and ejection stability.

The mechanism for exhibiting the aforementioned effects by the above specific combination has not been determined yet, but it is presumed as follows.

Conventionally, for printing on uncoated paper, a resin with high polarity is used as a resin component which is contained in an ink for improving dispersion stability. However, when printing is made on a coated paper, a printed material with low water resistance is yielded due to the resin with high polarity. Inventors of the present invention found that, when a resin having a low acid value is used, a printed material with excellent water resistance and solvent resistance can be produced. However, when a resin having a low acid value is used, there is a problem in terms of the dispersion stability and ejection stability like lower continuous ejection property or lower intermittent ejection property in inkjet mode.

As a method for improving the dispersion stability of a resin emulsion with an acidic value, a method of combining an inorganic salt like sodium hydroxide or a neutralizing agent like ammonia and ethylamine is known in a conventional art. However, when an inorganic salt is used, a member of an inkjet printer may be corroded and there is also a problem that poor stability is obtained as the inorganic salt reacts with an ink component such as a pigment or additives.

Meanwhile, when the neutralizing agent like ammonia and ethylamine is used in combination with a resin having a low acid value of less than 10 mg KOH/g, pH easily fluctuates and becomes unstable only by losing a slight amount of neutralizing agent, because the number of the acidic groups in the resin is small. For example, as aggregation or precipitation of the resin or thickening of a dispersion occurs in association with volatilization of a neutralizing agent like ammonia during storage, if it is used for an inkjet mode, a decrease in continuous ejection property or intermittent ejection property occurs so that a problem of having deteriorated ejection stability occurs.

As a result of diligent studies, the inventors of the present invention found that, by using in combination an amino alcohol having a boiling point of 100° C. or more and 300° C. or less with the resin having a low acid value, an ink with excellent storage stability and ejection stability can be obtained. In this regard, it is presumed that, by using an amino alcohol having a boiling point of 100° C. or more, problems associated with reduced amino alcohol concentration caused by volatilization are suppressed so that the pH of the ink is stabilized. Furthermore, by suppressing a decrease in pH, there is a merit of lowering the risk of having corrosion of an inkjet printer member.

It is also presumed that, by having a hydroxyl group, the amino alcohol not only functions as a neutralizing agent for a resin but also enhances the affinity between the resin and water or an aqueous solvent. It is also presumed that, as a result, the dispersion state of the resin emulsion in an ink composition is further stabilized so that a problem like aggregation does not occur and excellent ejection stability is exhibited. Furthermore, by selecting an amino alcohol having a boiling point of 300° C. or less, not only are enhanced the dispersion stability and ejection stability of the ink but also the drying property, water resistance, and solvent resistance of the ink can be maintained at favorable level. In a case in which the amino alcohol has a boiling point of more than 300° C. or more, it may remain in an ink printed on a printed material, thus causing slow drying or poor water resistance or poor solvent resistance. Furthermore, since it is sufficient for the ink composition of the present invention that the amino alcohol is added to the extent that a resin having a low acid value can be neutralized, the amino alcohol can be added in a small amount, and an amount of a basic material with high water solubility can be suppressed so as not to contain it excessively, and thus a printed material with more excellent water resistance and solvent resistance can be obtained.

As described in the above, the inkjet recording ink composition of the present invention has excellent water resistance and solvent resistance and also excellent storage stability and ejection stability, and thus it is unlikely to have an occurrence of poor ejection even in the case of continuous ejection or intermittent ejection. Thus, it can be preferably applied for use in inkjet recording.

According to the inkjet recording ink composition of the second embodiment described above, at least part of the acidic groups of a resin having an acid value of less than 10 mg KOH/g are neutralized in advance with an amino alcohol having a boiling point of 100° C. or more and 300° C. or less to prepare an ink composition. Thus, the effect of storage stability is further enhanced and the water resistance and solvent resistance are excellent.

As a result of diligent studies, the inventors of the present invention found that, by using an a resin having an acid value of less than 10 mg KOH/g, in which at least part of the acidic groups are neutralized by an amino alcohol having a boiling point of 100° C. or more and 300° C. or less, excellent storage stability or excellent ejection stability of an ink can be obtained. In this regard, it is presumed that, according to neutralization of an amino alcohol having a boiling point of 100° C. or more, the resin can be neutralized without using a volatile neutralizing agent like ammonia, and as the neutralizing agent in the resin is less likely to volatilize, a change in pH of the ink is suppressed so that the dispersion stability of a resin emulsion and the storage stability and ejection stability of the ink are further enhanced.

Furthermore, since it is sufficient for the inkjet recording ink composition of the second embodiment that the amino alcohol is added to the extent that a resin having a low acid value can be neutralized, the amino alcohol can be added in a small amount and an amount of a basic material with high water solubility can be suppressed so as not to contain it excessively, and thus a printed material with more excellent water resistance and solvent resistance can be obtained.

As described in the above, the inkjet recording ink composition of the present invention has excellent water resistance and solvent resistance and also excellent storage stability and ejection stability, and thus it is unlikely to have an occurrence of poor ejection even in the case of ejection or intermittent ejection. Thus, it can be preferably applied for use in inkjet recording.

The inkjet recording ink composition of the present invention contains a resin, an amino alcohol, a pigment, and a solvent, and within a range in which the effect of the present invention is not impaired, it may contain other components if necessary. Hereinbelow, each component of the inkjet recording ink composition of the present invention is described in order.

[Resin Having Add Value of Less than 10 mg KOH/g]

The resin used in the present invention has an add value of less than 10 mg KOH/g, and it is present in an emulsion state in the ink composition.

In the present invention, the emulsion states indicates a state in which the resin is dispersed, as resin fine particles, in the ink. Hereinbelow, the resin fine particles may be referred to as a resin emulsion.

The resin emulsion in the ink has a property of thickening and aggregating as the solvent is decreased by evaporation or infiltration and the concentration relatively increases. Thus, by suppressing the infiltration of the ink on a recording medium, it promotes fixing of a pigment on a recording medium.

In the present invention, by using a resin having an acid value of less than 10 mg KOH/g, the water resistance and solvent resistance of a printed material can be enhanced, and a printed material with excellent water resistance and solvent resistance can be provided even when a coated paper is used.

As for the resin, a resin having an acid value of less than 10 mg KOH/g can be suitably selected from, for example, an acrylic resin, a styrene-acrylic resin, a polystyrene resin, a polyester resin, a vinyl chloride resin, a vinyl acetate resin, a vinyl chloride vinyl acetate copolymer resin, a polyethylene resin, a urethane resin, a silicone (silicon) resin, an acrylamide resin, an epoxy resin, and a copolymerization resin thereof, and used. Those resins can be used either singly or in combination of two or more kinds.

In the present invention, the acrylic resin is preferably used among them from the viewpoint of properties like excellent dispersion stability, water resistance, and solvent resistance, and also from the viewpoint of high yield in production and excellent safety due to a small amount of a remaining monomer.

The monomer that constitutes the acrylic resin can be suitably selected from known (meth)acrylic acid ester monomers, and used. According to the present invention, within a range of having an acid value of less than 10 mg KOH/g, a (meth)acrylic acid ester monomer not having an acidic group is preferably contained as a main component and a monomer having an acidic group is suitably used in combination.

Incidentally, in the present invention, the acidic group means a group which exhibits acidity in water, and examples thereof include a carboxy group, a sulfo group, a phosphate group, an acid anhydride thereof, and acid halide.

As for the monomer not having an acidic group, a monomer can be suitably selected from known ones.

As for the monomer not having an acidic group, a monofunctional (meth)acrylic acid ester monomer is preferably used as a main component. In particular, a monomer not having any of an acid group, an amide group, an imide group, and a hydroxyl group is preferably used as a main component. Examples of the monofunctional (meth)acrylic acid ester monomer which is preferably used include (meth) acrylic acid alkyl ester, (meth)acrylic acid aralkyl ester, and (meth)acrylic acid alkoxyalkyl ester. Specific examples include mono(meth)acrylic acid ester such as methyl (meth)acrylic acid, ethyl (meth)acrylic acid, propyl (meth)acrylic acid, butyl (meth)acrylic acid, pentyl (meth)acrylic acid, neopentyl (meth)acrylic acid, hexyl (meth)acrylic acid, 2-ethylhexyl (meth)acrylic acid, octyl (meth)acrylic acid, nonyl (meth)acrylic acid, dodecyl (meth)acrylic acid, tridecyl (meth)acrylic acid, stearyl (meth)acrylic acid, cyclopentyl (meth)acrylic acid, cyclohexyl (meth)acrylic acid, 2-methylcyclohexyl (meth)acrylic acid, dicyclopentanyl (meth)acrylic acid, dicyclopentenyl (meth)acrylic acid, dicyclopentanyloxyethyl (meth)acrylic acid, dicyclopentenyloxyethyl (meth)acrylic acid, dicyclohexyl (meth)acrylic acid, isobornyl (meth)acrylic acid, adamantyl (meth)acrylic acid, allyl (meth)acrylic acid, propargyl (meth)acrylic acid, phenyl (meth)acrylic acid, naphthyl (meth)acrylic acid, anthracenyl (meth)acrylic acid, anthranynonyl (meth)acrylic acid, piperonyl (meth)acrylic acid, furyl (meth)acrylic acid, furfuryl (meth)acrylic acid, tetrahydrofuryl (meth)acrylic acid, tetrahydrofurfuryl (meth)acrylic acid, pyranyl (meth) acrylic acid, benzyl (meth)acrylic acid, phenethyl (meth) acrylic acid, cresyl (meth)acrylic acid, glycidyl (meth) acrylic acid, 3,4-epoxycyclohexylmethyl (meth)acrylic acid, 3,4-epoxycyclohexylethyl (meth)acrylic acid, 1,1,1-trifluoroethyl (meth)acrylic acid, perfluoroethyl (meth)acrylic acid, perfluoropropyl (meth)acrylic acid, heptadecafluorodecyl (meth)acrylic acid, triphenylmethyl (meth)acrylic acid, cumyl (meth)acrylic acid, 3-(N,N-dimethylamino)propyl(meth)acrylic acid, methoxyethyl (meth)acrylic acid, ethoxyethyl (meth)acrylic acid, butoxyethyl (meth)acrylic acid, 2-cyanoethyl (meth)acrylic acid, trimethoxysilylpropyl (meth)acrylic acid, triethoxysilylpropyl (meth)acrylic acid, 3-methacryloxypropylmethyldiethoxysilane, and 3-methacryloxypropylmethyldimethoxysilane. Those monomers can be obtained from MITSUBISHI RAYON CO., LTD., NOF CORPORATION, Mitsubishi Chemical Corporation, and Hitachi Chemical Company, Ltd., for example.

Since the aforementioned monomers are suitable for synthesis of a resin emulsion having a low add value which shows good reactivity and good dispersion stability during the synthesis, and thus preferable.

The monomers not having an acidic group for forming an acrylic resin may have, other than the aforementioned monofunctional (meth)acrylic acid ester monomer, other monomers, if necessary.

Other monomers are not particularly limited as long as it can provide desired water resistance and solvent resistance and may be a monofunctional monomer having one ethylenically unsaturated double bond, or a polyfunctional monomer having two or more ethylenically unsaturated double bonds.

For example, a vinyl monomer such as vinyl acetate, vinyl chloride, vinylidene chloride, vinyl fluoride, vinylidene fluoride, N-vinyl pyrrolidone, vinyl pyridine, N-vinyl carbazole, vinyl imidazole, vinyl ether, vinyl ketone, or vinyl pyrrolidone; an aromatic vinyl monomer such as styrene, α-, o-, m-, p-alkyl, nitro, cyano, amide, ester derivatives of styrene, vinyl toluene, or chlorostyrene; an olefin monomer such as ethylene, propylene, or isopropylene; a diene monomer such as butadiene or chloroprene; and a vinylcyanide compound monomer such as acrylonitrile or methacrylonitrile can be used.

Furthermore, a diacrylate compound such as polyethylene glycol diacrylate, triethylene glycol diacrylate, or 1,3-butylene glycol diacrylate; a triacrylate compound such as trimethylolpropanetriacrylate, trimethylolethane triacrylate, or tetramethylolmethane triacrylate; a dimethacrylate compound such as ethylene glycol dimethacrylate, diethylene glycol dimethacrylate, or triethylene glycol dimethacrylate; a trimethacrylate compound such as trimethylolpropane trimethacrylate, or trimethylolethane trimethacrylate; and divinylbenzene can be used, for example. Those monomers can be used either singly or in combination of two or more kinds.

Since desired performance can be given to an acrylic resin or reactivity during the synthesis can be controlled by the monomer, it is preferable that the monomer is suitably selected.

Furthermore, as a monomer not having an acidic group, a monomer having an amide group or an imide group or a monomer having a hydroxyl group may be used within a range of not impairing the effect of the present invention.

Examples of the monomer having an amide group or an imide group include an acylamide monomer such as acrylamide or N,N-dimethylacrylamide, (meth)acrylic acid anilide, monomaleimide such as N-benzylmaleimide, N-phenylmaleimide, N-cyclohexylmaleimide, N-laurinmaleimide, or N-(4-hydroxyphenyl)maleimide, and phthalimide such as N-(meth)acryloyl phthalimide.

Furthermore, examples of the monomer having a hydroxyl group include 2-hydroxyethyl (meth)acrylate, 2-hydroxypropyl (meth)acrylate and methyl α-(hydroxymethyl) (meth)acrylate, ethyl α-(hydroxymethyl) (meth)acrylate, n-butyl α-(hydroxymethyl) (meth)acrylate, 1,4-cyclohexanedimethanolmono (meth)acrylate, and 4-hydroxybutyl (meth)acrylate.

Examples of the monomer having an acidic group, which is used in combination within a range in which the acid value is less than 10 mg KOH/g, include a monomer containing a carboxy group, a sulfo group, a phosphate group, and an acid anhydride or acid halide thereof. Among them, preferred examples include a monomer containing a carboxy group which has a carboxy group and an ethylenically unsaturated double bond like acrylic acid, methacrylic acid, crotonic acid, itaconic acid, maleic acid, or fumaric acid. In particular, acrylic acid and methacrylic acid are more preferable. The monomer having an acidic group may be used either singly or in combination of two or more kinds.

The content ratio of the monomer having an acidic group in the acrylic resin is, relative to 100 parts by mass of the total amount of monomers in the acrylic resin, preferably 3 parts by mass or less, more preferably 2 parts by mass or less, and even more preferably 1.5 parts by mass or less. Meanwhile, the monomer having an acidic group is, relative to 100 parts by mass of the total amount of monomers in the acrylic resin, preferably 0.005 part by mass or more, more preferably 0.01 part by mass or more, and even more preferably 0.02 part by mass or more. When the content ratio of the monomer having an acidic group is equal to or more than the above lower limit value, excellent dispersion stability is obtained. Furthermore, when the content ratio of the monomer having an acidic group is equal to or less than the above upper limit value, excellent water resistance and solvent resistance can be obtained.

The content ratio of the monomer not having an acidic group is, relative to 100 parts by mass of the total amount of monomers in the acrylic resin, preferably 97 parts by mass or more, more preferably 98 parts by mass or more, and even more preferably 98.5 parts by mass or more. Meanwhile, the monomer not having an acidic group is, relative to 100 parts by mass of the total amount of monomers in the acrylic resin, preferably 99.995 parts by mass or less, more preferably 99.99 parts by mass or less, and even more preferably 99.98 parts by mass or less. In particular, the content ratio of the monomer not having any of an acidic group, an amide group, an imide group, and a hydroxyl group is, relative to 100 parts by mass of the total amount of monomers in the acrylic resin, preferably 97 parts by mass or more, more preferably 98 parts by mass or more, and even more preferably 98.5 parts by mass or more. In particular, the content ratio of the monomer not having any of an acidic group, an amide group, an imide group, and a hydroxyl group is, relative to 100 parts by mass of the total amount of monomers in the acrylic resin, preferably 99.995 parts by mass or less, more preferably 99.99 parts by mass or less, and even more preferably 99.98 parts by mass or less. When the content ratio of the monomer not having any of an acidic group, an amide group, an imide group, and a hydroxyl group is within the aforementioned range, not only excellent dispersion stability but also excellent water resistance and solvent resistance can be obtained.

When a monomer having an amide group or an imide group is used, the content ratio is, relative to 100 parts by mass of the total amount of monomers in the acrylic resin, preferably 1 part by mass or less, and more preferably 0.5 part by mass or less from the viewpoint of ensuring water resistance, solvent resistance, and storage stability and suppressing resin yellowing.

Furthermore, the content ratio of a monomer having a hydroxyl group is, relative to 100 parts by mass of the total amount of monomers in the acrylic resin, preferably 3 parts by mass or less, more preferably 1 part by mass or less, and even more preferably 0.5 part by mass or less from the viewpoint of ensuring water resistance and solvent resistance.

In the present invention, the acrylic resin can be obtained by copolymerization of those monomers according to a known method. Examples thereof include an emulsion polymerization method, a suspension polymerization method, and a solution polymerization method. Furthermore, a production method in which water, monomers, an emulsifying agent, and a polymerization initiator are mixed and subjected to emulsion polymerization followed by neutralization can be used. As for the neutralizing agent used for the neutralization, use of an amino alcohol having the specific boiling point like the production method of the present invention described below is particularly preferable from the viewpoint of storage stability and ejection stability. However, it is also possible to obtain a resin according to neutralization using a neutralizing agent like ammonia. Even in such a case, as the resin is neutralized, upon volatilization of ammonia, by amino alcohol which is included in the ink composition of the present invention, good storage stability and ejection stability is obtained.

Incidentally, as for the emulsifying agent, those generally used for emulsion polymerization can be used. Specifically, those described in, for example, JP 2012-51357 A can be used.

The acrylic resin can be any one of a block copolymer, a random copolymer, and a graft copolymer.

In the present invention, the acid value of the resin is less than 10 mg KOH/g. By using a resin having an acid value of less than 10 mg KOH/g, excellent resistance of a printed material, like water resistance, solvent resistance, and oil resistance can be obtained. The acid value is preferably 8 mg KOH/g or less, and more preferably 5 mg KOH/g or less. Furthermore, by using a resin having an acid value of less than 10 mg KOH/g, an interaction with a dispersion agent or a pigment can be reduced and a change in properties like surface tension or viscosity is suppressed, and thus the storage stability of an ink can be enhanced. Furthermore, from the viewpoint of suppressing aggregation between resin emulsions, the acid value of the resin is preferably 0.01 mg KOH/g or more, and more preferably 0.1 mg KOH/g or more.

Incidentally, the acid value in the present invention indicates mass (mg) of potassium hydroxide which is required for neutralizing an acidic component contained in 1 g of a sample (solid component in the resin), and it is a value measured in conformity with the method described in JIS K 0070. In the present invention, the acid value of a resin is measured in a state in which the resin is dissolved by extracting a resin with a poorly water soluble solvent like benzene and removing the neutralizing agent like amino alcohol included in the resin. The acid value of a resin is determined by the type or content ratio of monomer having an acidic group among the monomers for forming a resin, and it is not affected by a neutralizing agent. Namely, the same acid value is obtained even when an acid value of a resin is measured before neutralization, in a state in which part of acidic groups is neutralized, or after neutralization. Accordingly, the measured acid values in these states are all treated equivalently in the present invention.

In the present invention, the amine value of the resin is, although not particularly limited, preferably 10 mg KOH/g or less from the viewpoint of having excellent water resistance and solvent resistance and also excellent storage stability and yellowing resistance. It is more preferably 5 mg KOH/g or less, and even more preferably 2 mg KOH/g or less.

Incidentally, the amine value in the present invention indicates mass (mg) of potassium hydroxide that is an equivalent amount of hydrochloric acid amount required for neutralizing 1 g of a solid component in the resin, and it is a value measured in conformity with the method described in JIS K 7237.

Furthermore, in the present invention, the hydroxyl group value of the resin is not particularly limited, but from the viewpoint of having excellent water resistance and solvent resistance and also excellent storage stability, it is preferably 10 mg KOH/g or less, more preferably 5 mg KOH/g or less, and even more preferably 2 mg KOH/g or less.

Incidentally, in the present invention, the hydroxyl group value indicates mg of potassium hydroxide that is required for acetylating OH group contained in 1 g of a solid component in the resin, and it is measured in conformity with the method described in JIS K 0070, that is, OH group in a sample is acetylated by using acetic anhydride and unused acetic acid is titrated with an aqueous solution of potassium hydroxide.

Incidentally, the acid value, amine value, and hydroxyl group value can be suitably adjusted based on the type or content ratio of the monomer for forming the resin.

The pH of the resin emulsion is preferably 7 or more and 12 or less, and more preferably 7 or more and 10 or less, from the viewpoint of enhancing storage stability and ejection stability and suppressing metal corrosion of an inkjet nozzle.

Incidentally, the pH of the resin emulsion can be measured by using a pH meter which uses a glass electrode based on JIS Z 8802. In the present invention, the pH of the resin emulsion was measured at 25° C. by using pH meter HM-30R manufactured by DKK-TOA CORPORATION.

Although the molecular weight of the resin used in the present invention can be suitably selected and it is not particularly limited, from the viewpoint of dispersion stability of a resin emulsion and water resistance and solvent resistance of a printed material, the weight average molecular weight is preferably 10,000 or more, and more preferably in the range of 10,000 or more and 1,000,000 or less, and even more preferably 10,000 or more and 500,000 or less.

Incidentally, the weight average molecular weight Mw is a value measured by GPC (gel permeation chromatography) (HLC-8120GPC manufactured by TOSHO CORPORATION), and it is measured as follows: N-methylpyrrolidone added with 0.01 mol/liter lithium bromide is used as a solvent for elution, Mw 377400, 210500, 96000, 50400, 206500, 10850, 5460, 2930, 1300, 580 (Easi PS-2 series, all manufactured by Polymer Laboratories) and Mw 1090000 (manufactured by TOSHO CORPORATION) are used as a polystyrene standard for calibration curve and TSK-GEL ALPHA-M×2 columns (manufactured by TOSHO CORPORATION) are used.

In the present invention, the glass transition temperature (Tg) of a resin emulsion can be suitably selected. In particular, it is preferably in the range of 10° C. or more and 90° C. or less, more preferably in the range of 15° C. or more and 80° C. or less, and even more preferably in the range of 20° C. or more and 70° C. or less. As the Tg has a value equal to or higher than the above lower limit value, sticking after drying of a printed surface is reduced so that a printed material can have excellent resistance. Due to the reduced sticking, an occurrence of blocking, which is a problem of having adhesion of a printed surface of a printed material on other member, can be suppressed when the printed materials are stacked, for example. Furthermore, as the Tg is equal to or lower than the above upper limit value, application of a high temperature for forming a printed material can be avoided so that the energy cost can be reduced or damages of a printing substrate caused by heat can be avoided.

Incidentally, the Tg can be adjusted based on the type or content of monomer for forming the resin.

In the present invention, the glass transition temperature (Tg) can be measured by differential scanning calorimeter (DSC). Incidentally, the glass transition temperature (Tg) of the present invention is measured by a differential scanning calorimeter "DSC-50" which is manufactured by SHIMADZU CORPORATION.

Furthermore, conductivity of the resin emulsion can be suitably adjusted and it is not particularly limited. However, it is preferably 300 μS/cm or less, more preferably 200 μS/cm or less, and even more preferably 150 μS/cm or less. That is because, as the conductivity is within the aforementioned range, ionic groups and their counter ions or ionic impurities are low in the resin and the resin can have a low acid value and low polarity. Furthermore, as the ionic groups are low, it may exhibit only a minor influence on the dispersion stability of a pigment.

In particular, when a self-dispersion type pigment in which a functional group like hydrophilic group is introduced to a pigment surface is used, as the conductivity of a resin is within the aforementioned range, the reactivity between the resin and the self-dispersion type pigment can be lowered and the storage stability of an ink can be enhanced. If the conductivity is excessively high, there is a possibility that the dispersion state of a pigment dispersion, in which dispersion stability is maintained by electrostatic repulsion, is unstabilized and, in particular, if a self-dispersion type pigment having a hydrophilic group directly modified onto a pigment surface is contained, the ink stability may be impaired.

Furthermore, it is preferable that the lower limit of the conductivity of the resin is as low as possible from the viewpoint described above. However, it is generally 20 μS/cm or more. That is because, as it is 20 μS/cm or more, excellent dispersion stability of a resin is obtained so that a resin with stable quality can be easily produced.

Incidentally, the conductivity indicates the conductivity of an aqueous solution in which the resin solid content is 1% by mass.

Furthermore, as for the measurement of the conductivity, a method in which the resin is first diluted with ion exchange water to have the solid content of 1% by mass and conductivity of an aqueous solution having the resin solid content of 1% by mass is measured by using a conductivity meter can be employed. Furthermore, as a conductivity meter, Model: EC Testr 11+ manufactured by Eutech Instruments can be used.

Conductivity of an aqueous solution having the resin solid content of 1% by mass may be adjusted based on the type or a resin, type of a monomer, reaction mechanism, type of an emulsifying agent, presence or absence of an added emulsifying agent, and type of a neutralizing agent, for example. When the acid value, amine value, and hydroxyl group value are within the aforementioned range, an increase in the conductivity can be prevented. When the acid value, amine value, and hydroxyl group value are higher than the aforementioned range, polarity of the resin increases so that the conductivity also increases.

In the inkjet recording ink composition of the present invention, the content ratio of the resin is, although not particularly limited, preferably 0.05 part by mass or more and 20 parts by mass or less, more preferably 0.1 part by mass or more and 15 parts by mass or less, and even more preferably 1 part by mass or more and 10 parts by mass or less relative to 100 parts by mass of the whole amount of the ink composition, from the viewpoint of the stability, water resistance, and solvent resistance of a resin emulsion in the ink.

In the inkjet recording ink composition of the present invention, the resin is present in an emulsion state. The average particle diameter (average dispersion particle diameter) of the resin in ink is, although not particularly limited, preferably 500 nm or less, more preferably 200 nm or less, and even more preferably 150 nm or less from the viewpoint of having dispersion stability of a resin emulsion and having excellent ejection property of an ink in inkjet method and excellent glossiness of a printed material. Incidentally, it is preferable that the lower limit of the average particle diameter is as low as possible, and thus it is not particularly limited. However, it is generally 30 nm or more.

The average particle diameter (average dispersion particle diameter) of the resin in ink can be measured by dynamic light scattering. The dynamic light scattering is a method in which particle size is measured by utilizing a difference in light intensity distribution of diffracted and scattered light which is generated depending on particle size when a particle is irradiated with laser light. For example, it can be measured by using Micro track particle size distribution measurement device UPA manufactured by NIKKISO CO., LTD. or by a high concentration particle size analyzer FPAR-1000 manufactured by Otsuka Electronics Co., Ltd. Furthermore, the measurement is carried out at conditions including the measurement temperature of 25° C., integration time of 3 minutes, and laser wavelength of 660 nm used for the measurement. By analyzing the obtained data by CONTIN method, the scattering intensity distribution is obtained and the particle diameter with highest frequency can be determined as an average particle diameter. Incidentally, the average particle diameter described herein indicates a volume average particle diameter. Incidentally, the measurement of the present invention is performed by a high concentration particle size diameter analyzer FPAR-1000 that is manufactured by Otsuka Electronics Co., Ltd.

[Amino Alcohol]

The inkjet recording ink composition of the present invention contains an amino alcohol which has a boiling point of 100° C. or more and 300° C. or less. By using the amino alcohol with such specific boiling point and a hydroxyl group in combination with the resin, an inkjet recording ink composition having excellent storage stability and ejection stability and allowing a printed material with excellent water resistance and solvent resistance can be provided. In this regard, it is presumed that, as the amino alcohol has a hydroxyl group, it functions as a neutralizing agent for the resin and also it contributes to an improvement of affinity between the resin and water or an aqueous solvent.

In the present invention, the amino alcohol used is an amino alcohol having a boiling point of 100° C. or more, and thus the volatilization is suppressed and the pH stability is excellent. Accordingly, even when a self-dispersion type pigment, of which dispersion stability is easily lowered by a change in pH, is used, good dispersion stability of the self-dispersion type pigment can be obtained. Furthermore, it is presumed that, as the amino alcohol has a hydroxyl group, it functions as a neutralizing agent for the resin and also improves the affinity of the resin to water or an aqueous solvent. It is thus presumed that, as a result, the dispersion state of a resin emulsion in the ink composition is stabilized, problems like aggregation are absent, and an excellent ejection property is obtained.

In the present invention, the amino alcohol is a compound which has an alkyl group substituted with at least one hydroxyl group, and at least one amino group. The amino group may be any one of primary, secondary, or tertiary amino group. The amino alcohol group used in the present invention preferably has, from the viewpoint of dispersion stability of the resin, a structure represented by the following General Formula (I).

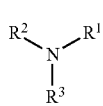

(in General Formula (I), $R^1$ to $R^3$ is each independently a hydrogen atom, an alkyl group which may have a substituent group and may contain an oxy group, or an aryl group which may have a substitutent group, and at least one of $R^1$ to $R^3$ is an alkyl group having at least a hydroxyl group. $R^1$ to $R^3$ may bind to each other to form a cyclic structure and may contain a bond with heteroatom).

The alkyl group in $R^1$ to $R^3$ may be a linear, branched or cyclic alkyl group, or an alkylene oxide group containing an oxy group. The carbon atom number of the alkyl group is not particularly limited. However, from the viewpoint of an interaction with the resin, the carbon atom number is preferably 1 or more and 4 or less.

Examples of the substituent group which may be contained in an alkyl group include, from the viewpoint of dispersion stability of a resin emulsion, preferably a hydroxyl group, an amino group, or an aryl group. Incidentally, at least one of $R^1$ to $R^3$ has a hydroxyl group.

Examples of the aryl group in $R^1$ to $R^3$ include a phenyl group, a benzyl group, and a naphthyl group. It is preferably a phenyl group. Examples of the substituent group which may be contained in an aryl group include an alkyl group with carbon atom number of 1 or more and 4 or less, and a halogen atom. From the viewpoint of an interaction between the resin and an amino group, it is preferably a non-bulky group. The number of the aryl group in General Formula (I) is preferably 2 or less, and more preferably 1 or less.

Examples of the cyclic structure which may be formed by bonding of $R^1$ to $R^3$ to each other include a pyrrolidine ring structure and a piperidine ring structure. It is also possible that an oxygen atom or a nitrogen atom is contained as a heteroatom in the cyclic structure to form a morpholine structure or a piperazine structure.

Number of the hydroxyl group in General Formula (I) is not particularly limited, as long as it is 1 or more. However, from the viewpoint of affinity with the resin or water or solvent in the ink composition and easily having a boiling point of 100° C. or more and 300° C. or less, the number of hydroxyl group is preferably 1 or more and 3 or less, more preferably 1 or more and 2 or less, and even more preferably 1.

A boiling point of the amino alcohol used in the present invention is 100° C. or more and 300° C. or less, preferably 100° C. or more and 250° C. or less, and even more preferably 100° C. or more and 200° C. or less. If the boiling point is excessively high, the ink composition may dry slowly or a printed material with poor resistance may be yielded. On the other hand, if the boiling point is excessively low, the volatility is high so that a problem may occur in terms of the storage stability and ejection stability.

Specific examples of the amino alcohol include 1-(dimethylamino)-2-propanol (boiling point: 126° C.), N,N-dimethyl-2-aminoethanol (boiling point: 135° C.), N-benzylethanolamine (boiling point: 153° C.), N,N-dimethylisopropanolamine (boiling point: 159° C.), l-amino-2-propanol (boiling point: 159° C.), N-methylethanolamine (boiling point: 160° C.), N,N-diethyl-2-aminoethanol (boiling point: 162° C.), 2-(dimethylamino)-2-methyl-1-propanol (boiling point: 163° C.), 3-(dimethylamino)-1-propanol (boiling point: 164° C.), 2-amino-2-methyl-1-propanol (boiling point: 166° C.), 3-(methylamino)-1-propanol (boiling point: 169° C.), N-ethylethanolamine (boiling point: 169° C.), 2-aminoethanol (boiling point: 170° C.), N-t-butylethanolamine (boiling point: 175° C.), 3-amino-1-propanol (boiling point: 188° C.), N-n-butylethanolamine (boiling point: 199° C.), diethanolamine (boiling point: 217° C.), 3-(dimethylamino)-1,2-propanediol (boiling point: 217° C.), 2-(2-aminoethoxy) ethanol (boiling point: 220° C.), N,N-dibutylethanolamine (boiling point: 229° C.), 2-(2-aminoethylamino)ethanol (boiling point: 244° C.), N-methyldiethanolamine (boiling point: 247° C.), hydroxyethylpiperazine (boiling point: 246° C.), 3-methylamino-1,2-propanediol (boiling point: 247° C.), N-ethyldiethanolamine (boiling point: 250° C.), 2-phenyl-2-aminoethanol (boiling point: 261° C.), N-n-butyldiethanolamine (boiling point: 265° C.), N-phenyldiethanolamine (boiling point: 270° C.), N-t-butyldiethanolamine (boiling point: 270° C.), and 2-amino-1,3-propanediol (boiling point: 277° C.). The amino alcohol may be used either singly or in combination of two or more kinds.

The content ratio of the amino alcohol in an ink composition is not particularly limited and it can be suitably adjusted. However, relative to 100 parts by mass of the total amount of the ink composition, it is preferably 0.001 part by mass or more, and more preferably 0.01 part by mass or more from the viewpoint of enhancing the dispersion stability of a resin composition and enhancing the storage stability and ejection stability of an ink composition. Meanwhile, the content ratio of the amino alcohol in an ink composition is preferably 1.0 part by mass or less, more preferably 0.5 part by mass or less, and even more preferably less than 0.1 part by mass relative to 100 parts by mass of the total amount of the ink composition from the viewpoint of enhancing the water resistance and solvent resistance of a printed material. When the content ratio of the amino alcohol is more than 1 part by mass in the ink composition, drying of a printed material may become slow.

When the content ratio of the amino alcohol is 0.001 part by mass or more, the ink composition has excellent pH stability. Accordingly, the resin emulsion has excellent stability and also the pigment can have excellent dispersion stability. In particular, even when a self-dispersion type pigment of which dispersion property is easily lowered according to a change in pH is used, the pigment dispersion stability is excellent. If the content of amino alcohol is within the aforementioned range, the dispersion stability of both the resin emulsion and self-dispersion type pigment can be maintained well, and a printed material can have a good drying property, and thus desirable.

[Pigment]

The pigment of the present invention can be suitably selected from known pigments that are used for an aqueous ink, and it can be either an organic pigment or an inorganic pigment.

Examples of the organic pigment include an insoluble azo pigment, a soluble azo pigment, a dye derivatives, phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, an organic solid solution pigment like a quinacridone-based solid solution pigments and perylene-based solid solution pigment, and other pigments such as carbon black.

When the organic pigment is exemplified with Color Index (C.I.) number, examples thereof include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, 214; C.I. Pigment Red 5, 7, 9, 12, 48, 49, 52, 53, 57, 97, 112, 122, 123, 147, 149, 168, 177, 180, 184, 192, 202, 206, 209, 215, 216, 217, 220, 223, 224, 226, 227, 228, 238, 240, 254; C.I. Pigment Orange 16, 36, 43, 51, 55, 59, 61, 64, 71; C.I. Pigment Violet 19, 23, 29, 30, 37, 40, 50; C.I. Pigment Blue 15, 15:1, 15:3, 15:4, 15:6, 16, 22, 60, 64; C.I. Pigment Green 7, 36, 58; and C.I. Pigment Brown 23, 25, 26.

Examples of the inorganic pigment barium sulfate, iron oxide, zinc oxide, barium carbonate, barium sulfate, silica, clay, talc, titanium oxide, calcium carbonate, synthetic mica, alumina, zinc flower, lead sulfate, yellow lead, zinc sulfide, Bengala (red iron oxide (III)), cadmium red, Ultramarine blue, Prussian blue, chrome oxide green, cobalt green, amber, titan black, synthetic iron black and an inorganic solid solution pigment.

The average dispersion particle diameter of the pigment is not particularly limited if it allows obtainment of desired color. It may vary depending on the type of a pigment to be used. However, from the viewpoint of having good pigment dispersion stability and sufficient coloring performance, it is preferably in the range of 5 nm or more and 200 nm or less, and more preferably in the range of 30 nm or more and 150 nm or less. That is because, when the average dispersion particle diameter is lower than the upper limit value described above, it is unlikely to have clogging of a nozzle of an inkjet head and an image with high reproducibility and high evenness can be obtained to provide a printed material with high quality. On the other hand, when it is lower than the lower limit described below, the light resistance may be impaired.

The content of the pigment is not particularly limited if it allows forming of a desired image, and it can be suitably adjusted. Specifically, it is preferably in the range of 0.05 parts by mass or more and 20 parts by mass or less, and more preferably in the range of 0.1 parts by mass or more and 10 parts by mass or less relative to 100 parts by mass of the whole amount of the ink composition, although it may vary depending on the type of a pigment. That is because, as the content is within the above range, the pigment having a good balance between the dispersion stability and coloration performance can be provided.

Furthermore, the pigment of the present invention can be a pigment dispersion in which the above pigment is dispersed in an aqueous solvent with a use of a surfactant or a dispersing agent for pigment dispersion, or it may be included, on a surface of the pigment, as a self-dispersion type pigment dispersion modified with hydrophilic group. In the present invention, a self-dispersion type pigment dispersion is preferably used from the viewpoint of water resistance. According to a conventional art, it is difficult to combine a resin emulsion with unstable pH and a self-dispersion type pigment dispersion from the viewpoint of the stability of pigment. However, in the present invention, as the ink composition has excellent pH stability, excellent dispersion stability can be obtained even when the self-dispersion type pigment is combined with a resin emulsion.

Examples of the self-dispersion type pigment include those modified with a carbonyl group, a carboxyl group, a hydroxyl group, a sulfonic acid group, or a phosphorus-containing group containing at least one P—O or P=O bond which is described in JP 2012-51357 A as a hydrophilic group. Furthermore, examples of a commercially available product include "CAB-O-JET (registered trade mark) 200", "CAB-O-JET (registered trade mark) 250C", "CAB-O-JET (registered trade mark) 260M", "CAB-O-JET (registered trade mark) 270Y", "CAB-O-JET (registered trade mark) 740Y", "CAB-O-JET (registered trade mark) 300", "CAB-O-JET (registered trade mark) 400", "CAB-O-JET (registered trade mark) 450C", "CAB-O-JET (registered trade mark) 465M", "CAB-O-JET (registered trade mark) 470Y", and "CAB-O-JET (registered trade mark) 480V" manufactured by Cabot Specialty Chemicals Corporation; "Microjet black 162, Aqua-Black 001", "BONJET (registered trade mark) BLACK CW-1" "BONJET (registered trade mark) BLACK CW-2" and "BONJET (registered trade mark) BLACK CW-3" manufactured by Orient Chemical Industries Co., Ltd.; and "LIOJET (registered trade mark) WD BLACK 002C" manufactured by Toyo Ink Co., Ltd. Among them, a self-dispersion type pigment which is modified with a phosphorus-containing group containing at least one P—O or P=O bond is preferable in that as it has excellent ink fixability or water resistance. The self-dispersion type pigment can be used either singly or in combination of two or more kinds. Due to the effect of a functional group modified onto the pigment, the pigment component of the self-dispersion type pigment can easily stay on a surface even when it is printed on a water absorbent substrate, and thus a sharp image can be obtained.

Meanwhile, as for the dispersing agent, those generally used for an ink can be used. Specifically, a surfactant including cationic, anionic, non-ionic and amphoteric surfactant described in JP 2012-51357 A can be used. In particular, a polymer surfactant (polymer dispersing agent) can be preferably used. A pigment dispersed by a polymer dispersing agent can form an ink coating while the pigment surface is covered with a polymer dispersing agent and a resin, and thus an image with high glossiness can be obtained. Examples of a commercially available product include "SMA1440" (styrene-maleic acid-maleic acid ester polymer dispersing agent, weight average molecular weight of 7,000, acid value of 185 mg KOH/g) manufactured by Sartomer Company, "Joncryl 682" (styrene-acryl acid polymer dispersing agent, weight average molecular weight of 1,700, acid value of 238 mg KOH/g) manufactured by BASF Japan, and "RY72" (styrene-acrylic acid-acrylic acid ester polymer dispersing agent, weight average molecular weight of 14,800, acid value of 170 mg KOH/g) manufactured by Gifu Shellac Manufacturing Co., Ltd. The mass ratio between the dispersing agent and pigment is preferably 10:1 to 10:3. The content of the dispersing agent in an ink composition is, relative to 100 parts by mass of the whole amount of the ink composition, preferably 1 part by mass or less. When the content of the dispersing agent is within the above range, a printed material can have excellent water resistance and solvent resistance.

[Solvent]

The inkjet recording ink composition of the present invention contains a solvent. The solvent can be suitably selected from solvents which do not react with each component of the ink composition but can dissolve or disperse each component. In particular, it is preferable to contain at least one solvent selected from an aqueous solvent and water. In the present invention, the aqueous solvent indicates a solvent which is dissolved at 3 parts by mass or more in 100 parts by mass of water at 25° C. and 1 atmospheric pressure.

In the present invention, it is preferable to contain, from the viewpoint of having dispersion stability of a resin, at least one solvent selected from an aqueous solvent and water at 50 parts by mass or more in 100 parts by mass of the whole solvent. It is more preferably contained at 70 parts by mass or more. It is even more preferably contained at 80 parts by mass or more. It is still even more preferably contained at 95 parts by mass or more.

Specific examples of the aqueous solvent include alkyl alcohols having 1 or more and 5 or less carbon atoms such as methyl alcohol, ethyl alcohol, n-propyl alcohol, isopropyl alcohol, n-butyl alcohol, sec-butyl alcohol, tert-butyl alcohol, isobutyl alcohol, or n-pentanol; monovalent alcohols such as 3-methoxy-3-methyl-1-butanol, 3-methoxy-1-propanol, 1-methoxy-2-propanol, or 3-methoxy-n-butanol; amides such as 1-dimethyl formamide, dimethyl acetamide, 3-methoxypropaneamide, 3-butoxypropaneamide, N,N-dimethyl-3-methoxypropaneamide, N,N-dibutyl-3-methoxypropaneamide, N,N-dibutyl-3-butoxypropaneamide, or N,N-dimethyl-3-butoxypropaneamide; ketones or ketoalcohols such as acetone or diacetonealcohol; ethers such as tetrahydrofuran or dioxane; oxyethylene or oxypropylene copolymers such as polyethylene glycol or polypropylene glycol; diols such as ethylene glycol, propylene glycol, diethylene glycol, dipropylene glycol, 1,3-propanediol, isobutylene glycol, triethylene glycol, tripropylene glycol, tetraethylene glycol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, or 3-methyl-1,5-pentanediol; triols such as glycerin, trimethylolethane, trimethylolpropane, or 1,2,6-hexanetriol: tetravalent alcohols such as mesoerythritol or pentaerythritol; monoalkyl ethers such as monomethyl (or ethyl, propyl, n-butyl, isobutyl) ethylene glycol ether, monomethyl (or ethyl, propyl, n-butyl, isobutyl) diethylene glycol ether, monomethyl (or ethyl, propyl, n-butyl, isobutyl) triethylene glycol ether, monomethyl (or ethyl, propyl, n-butyl) propylene glycol ether, or monomethyl (or ethyl, propyl, n-butyl) dipropylene glycol ether; dialkyl ethers of polyhydric alcohol such as diethylene glycol dimethyl ether, diethylene glycol diethyl ether, diethylene glycol ethylmethyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, or dipropylene glycol diethyl ether; alkanol amines such as monoethanolamine, diethanolamine, triethanolamine, N-methylethanolamine, N-ethylethanolamine, N-butylethanolamine, N-methyldiethanolamine, N-ethyldiethanolamine, or N-butyldiethanolamine; nitrogen-containing heterocyclic compounds such as N-methyl-2-pyrrolidone, 2-pyrrolidone, or 1,3-dimethyl-2-imidazolidinone; and cyclic compounds such as γ-butyrolactone or sulforane.

The aqueous solvent used in the present invention is preferably a solvent which is dissolved at 5 parts by mass or more in 100 parts by mass of water at 25° C. and 1 atmospheric pressure. When monoalkyl ethers are contained, for example, specific examples of the preferred include diethylene glycol monomethyl ether, diethylene glycol monoethyl ether, diethylene glycol mono-n-butyl ether, dipropylene glycol monoethyl ether, and dipropylene glycol monomethyl ether.

Furthermore, as an aqueous solvent of the present invention, an aqueous solvent in which the ratio (V50/V20) of the viscosity of 50% by mass aqueous solution of the aqueous solvent (V50) and the viscosity of 20% by mass aqueous solution of the aqueous solvent (V20) is in the range of 2.0 or more and 3.6 or less, in particular, an aqueous solvent of which the ratio is in the range of 2.0 or more and 3.2 or less is preferably contained, and the aqueous solvent is preferably contained at 50 parts by mass or more in 100 parts by mass of the whole aqueous solvent. That is because, as the aqueous solvent having viscosity ratio within the aforementioned range is contained at 50 parts by mass or more relative to 100 parts by mass of the whole aqueous solvent, rapid increase of ink viscosity after volatilization of water in the ink adhered to an inkjet nozzle can be suppressed, and due to good fluidity, an ink with favorable continuous ejection property or ejection property after remaining untouched can be provided. The aqueous solvent having the viscosity ratio within the aforementioned range is preferably at 70 parts by mass or more, and even more preferably 80 parts by mass or more relative to 100 parts by mass of the whole aqueous solvent.

Incidentally, the method for measuring the viscosity is not particularly limited if it allows viscosity measurement with good precision. Examples of the method include a method using a viscosity measurement device like a rheometer, a B type viscometer, and a capillary type viscometer, for example. The capillary type viscosity measurement can be performed based on the method described in DIN 53015 or ISO/DIS 12058. More specifically, the measurement can be performed at measurement temperature of 25° C. by using a capillary type viscometer "AMVn" manufactured by Anton Paar.

Preferred examples of the aqueous organic solvent which has V50/V20 satisfying the range of 2.0 or more and 3.6 or less include monovalent alcohols, diols, triols, monoalkyl ethers, and dialkyl ethers. It is more preferably monovalent alcohols, diols, or triols. Furthermore, ethylene glycol, diethylene glycol, triethylene glycol, propylene glycol, 1,2-butanediol, 1,2-hexanediol, 1,2-pentanediol, 1,3-propanediol, 1,3-butanediol, 1,4-butanediol, 3-methoxy-3-methyl-1-butanol, 3-methoxy-1-butanol, and glycerin are even more preferred.

Water to be contained in the above solvent preferably does not contain various ions, and de-ionized water is preferably used.

The content of water in the solvent can be suitably adjusted as long as each component can be dispersed or dissolved therein. In particular, it is preferably in the range of 10 parts by mass or more and 95 parts by mass or less, more preferably in the range of 20 parts by mass or more and 95 parts by mass or less, and even more preferably in the range of 30 parts by mass or more and 90 parts by mass or less relative to 100 parts by mass of the whole solvent.

Furthermore, the content of the aqueous solvent in an solvent is preferably in the range of 5 parts by mass or more and 90 parts by mass or less, more preferably in the range of 5 parts by mass or more and 80 parts by mass or less, and even more preferably in the range of 10 parts by mass or more and 70 parts by mass or less relative to 100 parts by mass of the whole solvent.

That is because, as the content of water and aqueous solvent is within the aforementioned range, less nozzle clogging may be obtained due to high moistening property. Furthermore, ejection from an inkjet head can be easily performed.

The solvent content can be suitably adjusted in consideration of the dispersion property or ejection property of the ink composition. In particular, the solvent is preferably contained such that the ink solid content is 0.1 part by mass or more and 30 parts by mass or less, more preferably 1 part by mass or more and 20 parts by mass or less, and even more preferably 1 part by mass or more and 15 parts by mass or less relative to 100 parts by mass of the whole ink composition. That is because, as the content is within the aforementioned range, an excellent ejection property can be obtained.

Incidentally, in the present invention, the solid content indicates all components other than a solvent in the ink.

[Other Components]

The inkjet recording ink composition of the present invention may contain other components within a range in which the effect of the present invention is not impaired. Examples of other components include a surfactant, an infiltrating agent, a moistening agent, a preservative, an anti-oxidant, a conductivity modifier agent, a pH adjuster agent, a viscosity modifier agent, an anti-foaming agent, and a deoxygenating agent.

In the present invention, from the viewpoint of enhancing the ejection stability of an inkjet recording ink composition and adjusting the surface tension of the ink composition, it preferably contains a surfactant.

The surfactant can be suitably selected from conventionally known ones. In particular, from the viewpoint of having an excellent property of adjusting surface tension, an anionic surfactant, a non-ionic surfactant, a silicone (silicon)-based surfactant, a fluoro surfactant, and an acetylene glycol-based surfactant are preferably used. Specific examples thereof include EMAL, LATEMUL, Pelex, NeoPelex, Demol (all are anionic surfactant; manufactured by Kao Corporation), Sannol, Lipolan, Lipon, and Lipal (all are anionic surfactant; manufactured by Lion Corporation), New Call 290-A, 290-KS, New Call 291-M, New Call 291-PG, New Call 291-GL, New Call 292-PG, New Call 293, New Call 297 (all are anionic surfactant; manufactured by Nippon Nyukazai Co., Ltd.), Noigen, Epan, and Solgen (all are non-ionic surfactant; manufactured by DKS Co. Ltd.) Emalgen, Amito, and Emasol (all are non-ionic surfactant; manufactured by Kao Corporation), Naroacty, Emulmin, and Sannonic (all are non-ionic surfactant; manufactured by Sanyo Chemical Industries, Ltd.), Surfynol 104, 82, 465, 485, TG, 2502, Dynol 604, Dynol 607 (all are acetylene glycol based surfactant; manufactured by Air Products and Chemicals, Inc.), Olfine E1004, E1010, PD-004, PD-501, PD-502, SPC, EXP4300, Surfynol MD-20 (all are acetylene glycol based surfactant; manufactured by; Nissin Chemical Co., Ltd.), Acetylenol EH, E40, E60, E81, E100, E200 (all are manufactured by Kawaken Fine Chemicals Co., Ltd.), Megaface (fluorine-based surfactant; manufactured by DIC Corporation), SURFLON (fluorine-based surfactant; manufactured by AGC SEIMI CHEMICAL CO., LTD., BYK-330, BYK-333, BYK-348, BYK-381, BYK-3455, BYK-3410, BYK-3411, BYK-DYNWET800, BYK-3440 (all are non-ionic surfactant; manufactured by BYK Chemie), SILFACE SAG503A, SILFACE SJM-002, SILFACE SJM-003 (all are silicone (silicon)-based surfactant; manufactured by Nissin Chemical Co., Ltd.), FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, 8616 ADDITIVE (all are silicone (silicon)-based surfactant; manufactured by Dow Corning Toray Co., Ltd.), and KF-6012, KF-6015, KF-6004, KF-6013, KF-6011, KF-6043, KP-104, 110, 112, 323, 341 (all are silicone (silicon)-based surfactant; manufactured by Shin-Etsu Chemical Co., Ltd.). The content of the surfactant is suitably adjusted based on the solvent or other component. The content of the surfactant is preferably 0.01 part by mass or more and 10.0 parts by mass or less and more preferably in the range of 0.1 part by mass or more and 5.0 parts by mass or less relative to 100 parts by mass of the whole inkjet recording ink composition.

In the present invention, from the viewpoint of having excellent storage stability and ejection stability of the ink, excellent dispersion stability of the resin, and having improved image sharpness due to excellent water resistance and solvent resistance of a printed material, at least one selected from a compound represented by the following General Formula (II) and a polysiloxane compound is preferably contained as a surfactant. From the viewpoint of having an excellent balance between an infiltration property to a coated paper and wettability, a compound represented by the following General Formula (II) is preferably used, in particular. It is more preferable to contain the compound represented by the following General Formula (II) and a polysiloxane compound.

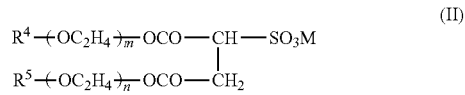

(in General Formula (II), $R^4$ and $R^5$ each independently represents a hydrogen atom or a linear or branched alkyl group having 1 or more and 20 or less carbon atoms, each of m and n is an integer of 0 or more and 20 or less, and M is a monovalent cation).

$R^4$ and $R^5$ each independently represents a hydrogen atom or a linear or branched alkyl group having 1 or more and 20 or less carbon atoms, and from the viewpoint of enhancing the dispersion stability of the resin, a linear or branched alkyl group having 4 or more and 20 or less carbon atoms is preferable, and a linear or branched alkyl group having 4 or more and 12 or less carbon atoms is more preferable. That is because a good ink infiltration property is obtained, it has high affinity for the resin, and thus the effect of enhancing the resin-dispersing property is high.

The values of m and n represent repetition number of ethylene oxide, and they can be suitably selected depending on the type of the resin or solvent, for example.

M can be suitably selected from known monovalent cations, and examples thereof include lithium ($Li^+$), sodium ($Na^+$), potassium ($K^+$), ammonia ($NH_4^+$), and triethanolamine (($HOCH_2CH_2C)_3NH^+$). In particular, from the viewpoint of the storage stability, that is, suppressing a change in viscosity or surface tension during long-term storage of an ink, sodium ($Na^+$) and potassium ($K^+$) are preferable.

Specific examples of the compound represented by General Formula (II) include AEROSOL TR-70 (ditridecylsulfosuccinate sodium), TR-70HG (ditridecylsulfosuccinate sodium), OT-75 (dioctyl sulfosuccinate sodium), OT-N (dioctyl sulfosuccinate sodium), MA-80 (dihexylsulfosuccinate sodium), IB-45 (diisobutyl sulfosuccinate sodium), EF-800 (sulfosuccinate sodiumethylene oxide modified half ester), and A-102 (sulfosuccinate sodium ethylene oxide modified half ester) manufactured by Nihon Cytec Industries, Pelex OT-P (dialkyl sulfosuccinate sodium), Pelex CS (dialkyl sulfosuccinate sodium), Pelex TR (dialkyl sulfosuccinate sodium), and Pelex TA (dialkyl sulfosuccinate sodium) manufactured by Kao Corporation, and New Call 290-A (dialkyl sulfosuccinate sodium), New Call 290-KS (dialkyl sulfosuccinate sodium), New Call 291-M (di-2-ethylhexylsulfosuccinate sodium), New Call 291-PG (di-2-ethylhexylsulfosuccinate sodium), New Call 291-GL (di-2-ethylhexylsulfosuccinate sodium), New Call 292-PG (dipolyoxyethylene-2-ethylhexylsulfosuccinate sodium), New Call 293 (monoalkyl sulfosuccinate disodium), and New Call 297 (monoalkyl sulfosuccinate disodium) manufactured by Nippon Nyukazai Co., Ltd. Among them, dialkylsulfosuccinate and dipolyoxyethylenealkylsulfosuccinate can be preferably used. In particular, di-2-ethylhexylsulfosuccinate, dihexylsulfosuccinate, ditridecylsulfosuccinate, dibutylsulfosuccinate, and dipolyoxyethylene-2-ethylhexylsulfosuccinate can be preferably used. That is because, by using the compound represented by General Formula (II), the dispersion stability of the resin can be further improved.

When the compound represented by General Formula (II) is used as a surfactant, the content is not particularly limited. However, from the viewpoint of the infiltration property of an ink and dispersion stability of a resin, it is preferably 0.005 part by mass or more, more preferably 0.01 part by mass or more, and even more preferably 0.03 part by mass or more relative to 100 parts by mass of the whole ink composition. Furthermore, the upper limit of the content of the compound represented by General Formula (II) is, although not particularly limited, preferably 5.0 parts by mass or less, more preferably 3.0 parts by mass or less, and even more preferably 1.0 part by mass or less relative to 100 parts by mass of the whole ink composition. That is because, as the content is within the aforementioned range, a good ink infiltration property and good dispersion stability of the resin can be obtained.

The polysiloxane compound used as a surfactant is not particularly limited if it has a polysiloxane bond (—Si—O—Si—) as a main skeleton, in particular a siloxane constitutional unit represented by the following General Formula (III).

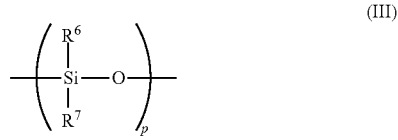
(III)

(in General Formula (III), $R^6$ and $R^7$ each independently represents a hydrogen atom, an alkyl group having 1 or more and 4 or less carbon atoms, or a phenyl group, and a plurality of $R^6$s may be the same or different to each other, a plurality of $R^7$s may be thus same or different to each other, and furthermore p is an integer of 2 or higher).

$R^6$ and $R^7$ are preferably an alkyl group having 1 or more and 4 or less carbon atoms from the viewpoint of having an excellent effect of lowering the surface tension and improving the wettability of the ink composition. In particular, a compound having a methyl group, that is, a polydimethylsiloxane compound, is more preferable.

Furthermore, p is not particularly limited if it is an integer of 2 or higher. However, it is preferably in the range of 2 or more and 10,000 or less, and more preferably in the range of 2 or more and 2,000 or less. That is because, by having a structure with such repetition number, the excellent effect of lowering the surface tension can be obtained.

The polysiloxane compound is not particularly limited if it has the siloxane constitutional unit described above. However, it is preferably a compound having a polyether group, that is, a polysiloxane compound modified with a polyether group. That is because, by having the polyether group, the polysiloxane compound can be easily prepared to be water soluble.

Examples of the polyether group include a group containing alkylene oxide. In particular, a group containing ethylene oxide and a group containing propylene oxide are preferable. A group containing ethylene oxide is particularly preferable. That is because, as it is an alkylene oxide group, it can be easily prepared to be water soluble.

The polysiloxane compound modified with a polyether group is not particularly limited if it has the aforementioned polyether group. For example, it can be a polysiloxane compound in which the silicon atom at single end or both ends of polysiloxane structure is substituted with a polyether group, or a polysiloxane compound having a polyether-containing constitutional unit hi which side chain of the polysiloxane structure, that is, any one of $R^6$ and $R^7$ in the siloxane constitutional unit, is substituted with a polyether group.

More specifically, examples include a polydimethylsiloxane modified with a polyether group which has a dimethylsiloxane constitutional unit in which $R^6$ and $R^7$ are each a methyl group and a polyether group-containing constitutional unit in which any one of $R^6$ and $R^7$ is each a methyl group and the other is a polyether group, and an terminal modified type polydimethylsiloxane modified with a polyether group which has a dimethylsiloxane constitutional unit in which $R^6$ and $R^7$ are a methyl group and the polyether group is contained at the terminal.

Weight average molecular weight of the polysiloxane compound is not particularly limited if it allows obtainment of desired wettability. However, it is preferably in the range of 300 or more and 60,000 or less. In particular, it is more preferably in the range of 500 or more and 30,000 or less, and particularly preferably in the range of 1,000 or more and 15,000 or less. That is because, as the molecular weight is within the aforementioned range, an excellent wettability can be obtained.

The polysiloxane compound is preferably water soluble. That is because, as it is water soluble, a deteriorated ejection property due to ink repellency by an inkjet head, which is caused by precipitation of the polysiloxane compound on an ink surface or precipitation of the compound on a surface of a member of an inkjet head, can be suppressed.

"Water soluble" as described herein means being dissolved at 0.1 part by mass or more in 100 parts by mass of water at 25° C. and 1 atmospheric pressure.

Incidentally, as for a method for controlling the degree of water solubility of a polysiloxane compound, the control can be made based on the type or number of the polyether group, or the molecular weight of the polysiloxane compound, for example.

In the present invention, a polyether-modified polysiloxane compound having a polyether group can be preferably used as a polysiloxane compound. In particular, a polyether-modified polysiloxane compound having water solubility can be more preferably used.

Examples of a commercially available product of the polyether-modified polysiloxane compound having water solubility include FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, 8616 ADDITIVE (all are manufactured by Dow Corning Toray Co., Ltd.), KF-6012, KF-6015, KF-6004, KF-6013, KF-6011, KF-6043, KP-104, 110, 112, 323, 341, (all are manufactured by Shin-Etsu Chemical Co., Ltd.), BYK-300/302, BYK-301, BYK-306, BYK-307, BYK-320, BYK-325, BYK-330, BYK-331, BYK-333, BYK-337, BYK-341, BYK-342, BYK-344, BYK-345/346, BYK-347, BYK-348, BYK-349, BYK-375, BYK-377, BYK-378, BYK-UV3500, BYK-UV3510, BYK-310, BYK-315, BYK-370, BYK-UV3570, BYK-322, BYK-323, BYK-3455, BYK-Silclean3700, (all are manufactured by BYK Chemie), and SILFACE SAG503A, SILFACE SJM-002, SILFACE SJM-003 (all are manufactured by Nissin Chemical Co., Ltd.).

The content of the polysiloxane compound is not particularly limited. However, from the viewpoint of having a good wettability, it is preferably 0.001 part by mass or more, more preferably 0.01 part by mass or more, and even more preferably 0.05 part by mass or more relative to 100 parts by mass of the whole ink composition. Furthermore, the upper limit of the content of the polysiloxane compound is, although not particularly limited, preferably 5.0 parts by mass or less, more preferably 3.0 parts by mass or less, and even more preferably 1.0 part by mass or less relative to 100 parts by mass of the whole ink composition. That is because, as the content is within the aforementioned range, a good wettability of an ink is obtained so that a dot diameter can be increased when the ink is landed on a substrate.

The mass ratio between the compound represented by General Formula (II) and the polysiloxane compound represented by General Formula (III), which are contained in an ink, is preferably 1:100 to 100:1, more preferably 1:50 to 50:1, and even more preferably 1:30 to 30:1. That is because, as the polysiloxane compound is contained at said ratio with the compound represented by General Formula (II), a good balance between the infiltration property into a coated paper and wettability can be obtained and an image with excellent sharpness can be obtained.

Furthermore, the total amount of the compound represented by General Formula (II) and the polysiloxane compound is preferably 0.005 part by mass or more, more preferably 0.01 part by mass or more, and even more preferably 0.05 part by mass or more relative to 100 parts by mass of the whole ink composition. Furthermore, the upper limit of the total amount of the compound represented by General Formula (II) and the polysiloxane compound is, although not particularly limited, preferably 15.0 parts by mass or less, more preferably 10.0 parts by mass or less, and even more preferably 5.0 parts by mass or less relative to 100 parts by mass of the whole ink composition. That is because both excellent infiltration property and excellent wettability can be obtained.

The pH value of the inkjet recording ink composition of the present invention is, from the viewpoint of having excellent dispersion stability of a resin and excellent ejection stability due to suppressed aggregation or precipitation of a resin emulsion, or suppressing the corrosion of metal like inkjet nozzle, preferably 7 or more and 12 or less, and more preferably 7 or more and 10 or less.

Incidentally, as for the pH value described in the present invention, a value measured by "Method for measuring pH" of JIS Z 8802-2011 is used.

The surface tension of the ink of the present invention is not particularly limited if it allows ejection of an ink from an inkjet head, and it varies depending on the type of a recording medium or the type of an inkjet head. For example, if a recording medium is uncoated paper, the paper has a high water absorbing property so that the printing can be preferably made within the range of 20 mN/m or more and 50 mN/m or less, and thus preferable.

On the other hand, if a recording medium has a low water absorbing property like coated paper, it is preferably in the range of 20 mN/m or more and 35 mN/m or less, more preferably in the range of 20 mN/m or more and 32 mN/m or less, even more preferably in the range of 20 mN/m or more and 30 mN/m or less, and still even more preferably in the range of 20 mN/m or more and 28 mN/m or less.

That is because, by having a value equal to or less than the upper limit described above, the ink is not likely absorbed and is repelled on a surface, and thus even when a coated paper not easily allowing large size dots is used, a surface of the coated paper can be wetted and the ink is spread thereon to enlarge the dot size, thus enabling forming of an image with high sharpness. Furthermore, by having a value equal to or more than the lower limit described above, the ejection stability of an ink from an inkjet head can be improved.

Incidentally, as described herein, the surface tension described in the present invention is a value measured by Wilhelmy method (manufactured by Kyowa Interface Science Co., LTD., Model: CBVP-Z) at measurement temperature of 25° C.

[Method for Producing Inkjet Recording Ink Composition]

The method for producing the inkjet recording ink composition of the first embodiment is not particularly limited, and it can be suitably selected from known methods of a conventional art. Examples of the method include a preparation method in which a self-dispersion type pigment provided with dispersion property given by modification of a pigment with a functional group, a resin, an amino alcohol, a surfactant, and if necessary, other components are added, and a preparation method in which a pigment and a dispersing agent are added and dispersed in a solvent, and a resin, an amino alcohol, a surfactant, and if necessary, other components are added.

The timing for mixing a resin with an amino alcohol is not particularly limited. For example, it is possible that an emulsion of the aforementioned specific resin is added in advance with the aforementioned specific amino alcohol and at least part of the acidic groups in the resin are neutralized and used, or a resin emulsion and an amino alcohol are prepared separately and they are admixed with each other during preparation of an inkjet recording ink composition.

Furthermore, the method for producing the inkjet recording ink composition of the second embodiment is not particularly limited, but it is preferable to use the following production method according to the present invention.

Namely, the method for producing an inkjet recording ink composition of the present invention is a method for producing an inkjet recording ink composition containing a resin having an acid value of less than 10 mg KOH/g, an amino alcohol with a boiling point of 100° C. or more and 300° C. or less, a pigment and a solvent, in which the resin is an emulsion state, and wherein it has a step of preparing a resin emulsion by neutralizing at least part of the acidic groups in the resin with the amino alcohol and a step of mixing the resin emulsion, the pigment, and the solvent.

According to the production method of the present invention, by adding an amino alcohol to a solvent at the time of producing a resin in the solvent, a resin emulsion solution in which the acidic groups of the resin are neutralized with the amino alcohol is prepared. Subsequently, by adding a pigment, a solvent, a surfactant, and if necessary, other components to the resin emulsion, an inkjet recording ink composition can be produced. Incidentally, the pigment is preferably added in a state of pigment dispersion in which it is dispersed in advance in a solvent. Any one of a self-dispersion type pigment in which the dispersion property is given according to modification of a pigment with a functional group and a pigment dispersed by a dispersing agent can be used.

According to the production method of the present invention, as the acidic groups are neutralized by the above specific amino alcohol during preparation of a resin emulsion, the resin emulsion can have higher stability and further improved storage stability, continuous ejection stability, and intermittent ejection stability compared to a case in which a volatile component like ammonia is used as a neutralizing agent. As the dispersion stability of the resin is improved by the hydroxyl group of an amino alcohol, the ink stability is further improved.

[Method for Inkjet Recording]

The inkjet recording method of the present invention includes a step of printing by an inkjet method by using the inkjet recording ink composition according to the present invention or an inkjet recording ink composition which is produced by the method for producing an inkjet recording ink composition according to the present invention.

According to the inkjet recording method of the present invention, the inkjet recording ink composition according to the present invention or an inkjet recording ink composition which is produced by the method for producing an inkjet recording ink composition according to the present invention is used, and thus a printed material with excellent water resistance and solvent resistance can be produced. Furthermore, as the inkjet ink composition has excellent ejection stability, a printed material with high quality can be obtained.

The recording medium used for the inkjet recording method of the present invention is not particularly limited as long as printing can be performed by using the inkjet ink composition of the present invention, and any one of an absorbing material or a non-absorbing material can be used. Examples of the absorbing material include uncoated papers such as ground wood paper, medium-quality paper and high-quality paper, coated paper such as coat paper, art paper and cast paper, cotton, synthetic fabrics, silk, hemp, cloth, unwoven cloth and leather. Examples of the non-absorbing material include, but are not limited to, a polyester-based resin, a polypropylene-based synthetic paper, a vinyl chloride resin, a polyimide resin, metals, metal foil coat paper, glass, synthetic rubbers, and natural rubbers.

In the present invention, coated papers are preferably used, in particular. That is because, as the ink composition according to the present invention is used, the effect of the present invention can be more effectively exhibited.

Incidentally, the present invention is not limited to the aforementioned embodiments. Those embodiments are mere exemplifications and whatever having substantially the same constitution as the technical idea described in the claim of the present invention and exhibits the same working effect is embraced within the technical scope of the present invention.

Preparation Example 1: Preparation of Pigment Dispersion P-1

The same procedures as those described in Kieczykowski at al., J. Org. Chem., 1995, Vol 60, P. 8310 to 8312 and U.S. Pat. No. 4,922,007 were used to produce a [2-(4-aminophenyl)-1-hydroxyethane-1,1-diyl]bisphosphonic acid sodium salt. First, a 500 mL three-neck flask was equipped with a condenser provided with a gas outlet at the top thereof, a thermometer, a dry nitrogen introduction port, and a 100 mL equalizing dropping funnel. First, 32 g of phosphorous acid (380 mmol) and 160 mL of methanesulfonic acid (solvent) were added to this flask. To the stirred mixture, 57.4 g of aminophenylacetic acid (380 mmol) was added little by little. The stirred mixture was heated at 65° C. for 1 to 2 hours to dissolve the solid completely. The whole system was flushed with dry nitrogen and the temperature of the system was dropped to 40° C. after the solid was completely dissolved. To the heated solution, 70 mL of $PCl_3$ (800 mmol) was gradually added through the dropping funnel. HCl gas generated from the reaction was discharged through the gas outlet. After the addition was completed, the reaction mixture was stirred for 2 hours and concurrently heated at 40° C. After that, the temperature of the system was heated to 65 to 70° C. and the mixture was stirred overnight. The produced clear and clean brown solution was cooled to ambient temperature and rapidly cooled by addition into the solution to 600 g of an ice/water mixture.

This aqueous mixture was poured into a 1 L beaker and heated at 90 to 95° C. for 4 hours (the top of the beaker was covered with a glass plate). Then, this mixture was cooled to ambient temperature and the pH of this mixture was adjusted to 4 to 5 with a 50% NaOH solution. This mixture was cooled to 5° C. in an ice bath for 2 hours, and then, the resulted solid was collected by suction filtration. The collected solid was washed with 1 L of cooled deionized water and dried at 60° C. overnight to obtain a white or off-white solid product (production amount: 48 g, yield: 39%). $^1$H-NMR data ($D_2O$/NaOH) of the obtained solid product was as follows: 7.3 (2H, d), 6.76 (2H, d), and 3.2 (2H, t). $^{13}$C-NMR data ($D_2O$/NaOH) of the obtained solid product was as follows: 141, 130, 128, 112, and 73.

Using a Silverson Mixer (6000 rpm), 20 g of C.I. Pigment Red 122 (PR122), 20 mmol of the solid product above, 20 mmol of nitric acid, and 200 mL of deionized water were blended at ambient temperature. After 30 minutes, sodium nitrite (20 mmol) dissolved in a small amount of water was slowly added to this mixture. The temperature reached 60° C. by mixing to allow the reaction to proceed for one hour. Accordingly, a self-dispersion type pigment in which the above solid product is modified onto PR122 (including pigments in which at least two phosphonic acid groups or salt thereof are bonded) was produced. The pH was adjusted to 8 to 9 with a NaOH solution. After 30 minutes, the dispersion having a self-dispersion type pigment generated therein was subjected to diafiltration by using 20 parts by volume of deionized water with a spectrum membrane to concentrate to have the solid content of 15% by mass. As a result, a red Pigment dispersion P-1 was obtained.

Preparation Examples 2 to 5: Preparation of Pigment Dispersions P-2 to P-5

Each of a yellow Pigment dispersion P-2, a blue Pigment dispersion P-3, and a black Pigment dispersion P-4 was obtained in the same manner as in Preparation Example 1 except that, instead of PR122 of Preparation Example 1, each of C.I. Pigment Yellow 74 (PY74), C.I. Pigment Blue 15:4 (PB15:4), and carbon black (Black Pearls (registered trade mark) 700 carbon black (manufactured by Cabot Corporation)) were used, respectively.

Furthermore, for a Pigment dispersion P-5, a sulfo group-treated self-dispersion type pigment "CAB-O-JET (registered trade mark) 740Y" was used.

Preparation Example 6: Preparation of Pigment Dispersion P-6

In 80.1 g of ion exchange water, 3.0 g of a styrene-acrylic acid based polymer dispersing agent ("Joncryl 682" manufactured by BASF Japan, weight average molecular weight of 1,700, and acid value of 238 mg KOH/g) and 1.1 g of N,N-dimethyl-2-aminoethanol were dissolved. After adding 15 g of PR122 and 0.1 g of an antifoaming agent ("Surfynol 104E" manufactured by Air Products and Chemicals, Inc.), they were dispersed by a paint shaker using zirconia beads to obtain a red Pigment dispersion P-6. Incidentally, the styrene-acrylic acid based polymer dispersing agent is not an emulsion and it has a property that is different from that of the resin having a low acid value of the present invention.

Preparation Example 7: Preparation of Resin Emulsion EM-1

After the atmosphere in a flask equipped with a mechanical stirrer, a thermometer, a nitrogen introduction tube, a reflux tube and a dropping funnel was sufficiently replaced with nitrogen gas, the flask was charged with 0.75 g of a reactive surfactant (product name: LATEMUL PD-104, manufactured by KAO Corporation), 0.04 g of potassium persulfate, 0.15 g of methacrylic acid and 150 g of pure water, and they were stirred at 25° C. to mix. A mixture of 20.8 g of butyl acrylate and 129 g of methyl methacrylate was added dropwise to the above mixture to prepare a pre-emulsion. Also, after the atmosphere in a flask equipped with a mechanical stirrer, a thermometer, a nitrogen introduction tube, a reflux tube and a dropping funnel was sufficiently replaced with nitrogen gas, the flask was charged with 3 g of a reactive surfactant (product name: LATEMUL PD-104, manufactured by KAO Corporation), 0.01 g of potassium persulfate, and 200 g of pure water, and they were stirred at 70° C. to mix. After that, the pre-emulsion produced above was added dropwise to the flask over three hours. After they were further aged at 70° C. under heating for 3 hours, 0.75 g of N,N-dimethyl-2-aminoethanol was added thereto. Then, the resulting mixture was filtered by a #150 mesh filter (manufactured by Nippon Orimono Co., Ltd.) to obtain 500 g of a resin emulsion EM-1 (solid content: 30% by mass).

Preparation Examples 8 to 14: Preparation of Resin Emulsion EM-2 to EM-8

The resin emulsion EM-2 to EM-8 (each with solid content of 30% by mass) were obtained in the same manner as in Preparation Example 7 except that composition of the monomer for forming the resin and amino alcohol of Preparation Example 7 were respectively modified to those described in Table 1-1.

Preparation Example 15: Preparation of Resin Emulsion EM-9

The resin emulsion EM-9 (with solid content of 30% by mass) was obtained in the same manner as in Preparation Example 7 except that composition of the monomer for forming the resin was modified to those described in Table 1-2 and the amino alcohol is modified to triethanolamine having a boiling point of 300° C. or more.

Preparation Examples 16 and 17: Preparation of Resin Emulsion EM-10 and EM-11

The resin emulsion EM-10 and EM-11 (each with solid content of 30% by mass) were obtained in the same manner as in Preparation Example 7 except that composition of the monomer for forming the resin of Preparation Example 7 was modified to those described in Table 1-2 and ammonia was used instead of amino alcohol.

[Physical Properties of Resin Emulsion]

Various properties were measured for the above resin emulsion EM-1 to EM-11, a commercially available resin emulsion (ammonia neutralization product of styrene-acrylic resin, manufactured by BASF, Joncryl 775 (hereinbelow, described as EM-12)) and a commercially available resin emulsion (ammonia neutralization product of styrene-acrylic resin, manufactured by BASF, Joncryl 537 (hereinbelow, described as EM-13). The results are shown in Table 1-1 to Table 1-2.

Incidentally, the numerical values for the resin component in Table 1-1 to Table 1-2 are described in parts by mass and the content ratio (%) of neutralizing amine indicates the amount of neutralizing amine (parts by mass) which is added to the whole amount of the resin (parts by mass).

TABLE 1-1

|  |  | EM-1 | EM-2 | EM-3 | EM-4 | EM-5 | EM-6 | EM-7 | EM-8 |
|---|---|---|---|---|---|---|---|---|---|
| Resin composition | MMA | 86.00 | 86.00 | 84.30 | 77.95 | 71.50 | 71.50 | 63.00 | 50.00 |
|  | BMA |  |  |  | 12.00 |  |  |  |  |
|  | BA | 13.90 | 13.90 | 14.30 |  | 28.45 | 28.45 | 25.50 |  |
|  | 2EHA |  |  |  | 10.00 |  |  | 11.00 | 40.00 |
|  | ST |  |  |  |  |  |  |  | 7.00 |
|  | MAA | 0.10 | 0.10 | 1.40 | 0.05 | 0.05 | 0.05 | 0.50 | 1.00 |
|  | DMAA |  |  |  |  |  |  |  | 2.00 |
|  | Total | 100.00 | 100.00 | 100.00 | 100.00 | 100.00 | 100.00 | 100.00 | 100.00 |
|  | Neutralizing amine | DMAE | AP | AMP | DMAE | DMAE | AMP | AMP | DMAE |
|  | amine % | 0.5 | 0.4 | 1 | 0.3 | 0.5 | 1 | 0.5 | 1 |
| Physical properties | Tg | 70 | 70 | 70 | 60 | 40 | 40 | 19 | −4 |
|  | Acid value | 1 | 1 | 9 | 0.3 | 0.3 | 0.3 | 3 | 7 |
|  | Amine value | 0 | 0 | 0 | 0 | 0 | 0 | 0 | 11 |
|  | Hydroxyl group value | 0 | 0 | 0 | 0 | 0 | 0 | 0 | 0 |
|  | Particle diameter | 110 | 110 | 110 | 100 | 120 | 120 | 140 | 150 |
|  | Conductivity | 145 | 150 | 170 | 120 | 135 | 160 | 110 | 220 |
|  | pH | 8.6 | 8.6 | 8.8 | 8.2 | 8.4 | 8.9 | 8.2 | 8.5 |

TABLE 1-2

|  |  | EM-9 | EM-10 | EM-11 | EM-12 | EM-13 |
|---|---|---|---|---|---|---|
| Resin composition | MMA | 63.00 | 86.00 | 71.50 | Joncryl 775 | Joncryl 537 |
|  | BMA |  |  |  |  |  |
|  | BA | 25.50 | 13.90 | 28.45 |  |  |
|  | 2EHA | 11.00 |  |  |  |  |
|  | ST |  |  |  |  |  |
|  | MAA | 0.50 | 0.10 | 0.05 |  |  |
|  | DMAA |  |  |  |  |  |
|  | Total | 100.00 | 100.00 | 100.00 |  |  |
|  | Neutralizing amine | TEA | NH4 | NH4 |  |  |
|  |  | 0.5 | 0.1 | 0.1 |  |  |
| Physical properties | Tg | 19 | 70 | 40 | 37 | 49 |
|  | Acid value | 3 | 1 | 0.3 | 55 | 40 |
|  | Amine value | 0 | 0 | 0 | 0 | 0 |
|  | Hydroxyl group value | 0 | 0 | 0 | 0 | 0 |
|  | Particle diameter | 140 | 110 | 120 | 90 | 90 |
|  | Conductivity | 100 | 180 | 170 | 665 | 515 |
|  | pH | 8.2 | 9.0 | 9.0 | 8.3 | 8.8 |

Incidentally, the abbreviations in Table 1-1 and Table 1-2 are as described below.

MMA: methyl methacrylic acid
BMA: butyl methacrylic acid
BA: butyl acrylic acid
2EHA: 2-ethylhexyl acrylic acid
MAA: methacrylic acid
DMAA: dimethylacrylamide
DMAE: N,N-dimethyl-2-aminoethanol
AP: 1-amino-2-propanol
AMP: 2-amino-2-methyl-1-propanol
TEA: triethanolamine
$NH_4$: ammonia Examples 1 to 25: Preparation of Ink Compositions 1 to 25

According to the composition of the following Table 2, each component was admixed with each other. By additionally adding water (that is, ion exchange water) to have total amount of 100 parts by mass, the ink compositions 1 to 25 were obtained.

The numerical values for each component in Table 2 are described in parts by mass and the numerical values for pigment dispersion and resin emulsion indicate the solid content expressed in parts by mass.

Furthermore, the content ratio (%) in Table 2 indicates the content ratio of an amino alcohol relative to the whole ink composition including solvent.

Comparative Examples 1 to 8: Preparation of Comparative Ink Compositions 1 to 8

According to the composition shown in the following Table 2, the comparative ink compositions 1 to 8 were obtained in the same manner as in Examples with adjustment of the total amount to 100 parts by mass.

TABLE 2

|  |  |  | Example |  |  |  |  |  |  |  |  |  |  |
|---|---|---|---|---|---|---|---|---|---|---|---|---|---|
|  |  |  | 1 | 2 | 3 | 4 | 5 | 6 | 7 | 8 | 9 | 10 | 11 |
| Ink | Pigment dispersion | P-1 | 5.0 | 5.0 | 5.0 | 5.0 | 5.0 | 5.0 | 5.0 | 5.0 |  |  |  |
|  |  | P-2 |  |  |  |  |  |  |  |  | 5.0 |  |  |
|  |  | P-3 |  |  |  |  |  |  |  |  |  | 5.0 |  |
|  |  | P-4 |  |  |  |  |  |  |  |  |  |  | 5.0 |
|  |  | P-5 |  |  |  |  |  |  |  |  |  |  |  |
|  |  | P-6 |  |  |  |  |  |  |  |  |  |  |  |
|  | Resin emulsion | EM-1 | 5.0 |  |  |  |  |  |  |  | 5.0 | 5.0 | 5.0 |
|  |  | EM-2 |  | 5.0 |  |  |  |  |  |  |  |  |  |
|  |  | EM-3 |  |  | 5.0 |  |  |  |  |  |  |  |  |
|  |  | EM-4 |  |  |  | 5.0 |  |  |  |  |  |  |  |
|  |  | EM-5 |  |  |  |  | 5.0 |  |  |  |  |  |  |
|  |  | EM-6 |  |  |  |  |  | 5.0 |  |  |  |  |  |
|  |  | EM-7 |  |  |  |  |  |  | 5.0 |  |  |  |  |
|  |  | EM-8 |  |  |  |  |  |  |  | 5.0 |  |  |  |
|  |  | EM-9 |  |  |  |  |  |  |  |  |  |  |  |
|  |  | EM-10 |  |  |  |  |  |  |  |  |  |  |  |
|  |  | EM-11 |  |  |  |  |  |  |  |  |  |  |  |
|  |  | EM-12 |  |  |  |  |  |  |  |  |  |  |  |
|  |  | EM-13 |  |  |  |  |  |  |  |  |  |  |  |
|  | Solvent | S-1 | 30.0 | 30.0 | 30.0 | 30.0 | 30.0 | 30.0 | 30.0 | 30.0 | 30.0 | 30.0 | 30.0 |
|  |  | S-2 |  |  |  |  |  |  |  |  |  |  |  |
|  |  | S-3 |  |  |  |  |  |  |  |  |  |  |  |
|  |  | S-4 |  |  |  |  |  |  |  |  |  |  |  |
|  | Amino alcohol | DMAE |  |  |  |  |  |  |  |  |  |  |  |
|  |  | AMP |  |  |  |  |  |  |  |  |  |  |  |
|  |  | OHPIZ |  |  |  |  |  |  |  |  |  |  |  |
|  |  | TEA |  |  |  |  |  |  |  |  |  |  |  |
|  | Surfactant | F-1 | 0.5 | 0.5 | 0.5 | 0.5 | 0.5 | 0.5 | 0.5 | 0.5 | 0.5 | 0.5 | 0.5 |
|  |  | F-2 |  |  |  |  |  |  |  |  |  |  |  |
|  |  | F-3 |  |  |  |  |  |  |  |  |  |  |  |
|  | Ion exchange water |  | balance | balance | balance | balance | balance | balance | balance | balance | balance | balance | balance |
|  | Total |  | 100.0 | 100.0 | 100.0 | 100.0 | 100.0 | 100.0 | 100.0 | 100.0 | 100.0 | 100.0 | 100.0 |
|  | Content of amino alcohol (%) |  | 0.025 | 0.020 | 0.050 | 0.015 | 0.025 | 0.050 | 0.025 | 0.050 | 0.025 | 0.025 | 0.025 |
| Evaluation | pH stability |  | A | A | A | A | A | A | A | A | A | A | A |
|  | Dispersion stability |  | A | A | A | A | A | A | A | A | A | A | A |
|  | Ejection stability |  | A | A | A | A | A | A | A | B | A | A | A |

TABLE 2-continued

|  |  |  |  |  |  |  |  |  |  |  |  |
|---|---|---|---|---|---|---|---|---|---|---|---|
| Intermittent ejection stability | A | A | A | A | A | A | A | B | A | A | A |
| Water resistance | A | A | B | A | A | A | A | B | A | A | A |
| Solvent resistance | A | A | B | A | A | A | A | B | A | A | A |

|  |  |  | Example |  |  |  |  |  |  |  |  |  |  |
|---|---|---|---|---|---|---|---|---|---|---|---|---|---|
|  |  |  | 12 | 13 | 14 | 15 | 16 | 17 | 18 | 19 | 20 | 21 | 22 |
| Ink | Pigment dispersion | P-1 |  |  | 5.0 | 5.0 | 5.0 | 5.0 |  |  |  |  |  |
|  |  | P-2 |  |  |  |  |  |  |  |  |  |  |  |
|  |  | P-3 |  |  |  |  |  |  |  |  |  |  |  |
|  |  | P-4 |  |  |  |  |  |  | 5.0 | 5.0 | 5.0 | 5.0 | 5.0 |
|  |  | P-5 | 5.0 |  |  |  |  |  |  |  |  |  |  |
|  |  | P-6 |  | 5.0 |  |  |  |  |  |  |  |  |  |
|  | Resin emulsion | EM-1 | 5.0 | 5.0 | 5.0 | 5.0 |  |  |  |  |  |  |  |
|  |  | EM-2 |  |  |  |  |  |  |  |  |  |  |  |
|  |  | EM-3 |  |  |  |  |  |  |  |  |  |  |  |
|  |  | EM-4 |  |  |  |  |  |  | 5.0 | 5.0 | 5.0 | 5.0 | 5.0 |
|  |  | EM-5 |  |  |  |  |  |  |  |  |  |  |  |
|  |  | EM-6 |  |  |  |  |  |  |  |  |  |  |  |
|  |  | EM-7 |  |  |  |  |  |  |  |  |  |  |  |
|  |  | EM-8 |  |  |  |  |  |  |  |  |  |  |  |
|  |  | EM-9 |  |  |  |  |  |  |  |  |  |  |  |
|  |  | EM-10 |  |  |  |  |  | 5.0 |  |  |  |  |  |
|  |  | EM-11 |  |  |  |  |  |  | 5.0 |  |  |  |  |
|  |  | EM-12 |  |  |  |  |  |  |  |  |  |  |  |
|  |  | EM-13 |  |  |  |  |  |  |  |  |  |  |  |
|  | Solvent | S-1 | 30.0 | 30.0 | 30.0 | 30.0 | 30.0 | 30.0 | 30.0 | 30.0 | 30.0 | 30.0 | 30.0 |
|  |  | S-2 |  |  |  |  |  |  |  |  |  |  |  |
|  |  | S-3 |  |  |  |  |  |  |  |  |  |  |  |
|  |  | S-4 |  |  |  |  |  |  |  |  |  |  |  |
|  | Amino alcohol | DMAE |  |  | 0.10 |  | 0.10 |  |  |  |  |  |  |
|  |  | AMP |  |  |  | 0.45 |  | 0.10 | 0.01 |  |  |  |  |
|  |  | OHPIZ |  |  |  |  |  |  |  |  | 0.55 |  |  |
|  |  | TEA |  |  |  |  |  |  |  |  |  |  |  |
|  | Surfactant | F-1 | 0.5 | 0.5 | 0.5 | 0.5 | 0.5 | 0.5 | 0.5 | 0.5 |  | 0.5 | 0.5 |
|  |  | F-2 |  |  |  |  |  |  |  |  |  |  | 0.5 |
|  |  | F-3 |  |  |  |  |  |  |  |  | 0.5 | 0.5 | 0.5 |
|  | Ion exchange water | balance | balance | balance | balance | balance | balance | balance | balance | balance | balance | balance |
|  | Total |  | 100.0 | 100.0 | 100.0 | 100.0 | 100.0 | 100.0 | 100.0 | 100.0 | 100.0 | 100.0 | 100.0 |
| Content of amino alcohol (%) |  |  | 0.025 | 0.025 | 0.125 | 0.475 | 0.100 | 0.100 | 0.025 | 0.565 | 0.025 | 0.565 | 0.565 |
| Evaluation | pH stability |  | A | A | A | A | A | A | A | A | A | A | A |
|  | Dispersion stability |  | A | A | A | A | A | A | A | A | AA | AA | AA |
|  | Ejection stability |  | A | A | A | A | A | A | A | A | A | A | A |
|  | Intermittent ejection stability |  | A | A | A | A | A | A | A | A | A | A | A |
|  | Water resistance |  | A | B | A | A | A | A | A | B | A | A | A |
|  | Solvent resistance |  | A | B | A | A | A | A | A | B | A | A | A |

|  |  |  | Example |  |  | Comparative Example |  |  |  |  |  |  |  |
|---|---|---|---|---|---|---|---|---|---|---|---|---|---|
|  |  |  | 23 | 24 | 25 | 1 | 2 | 3 | 4 | 5 | 6 | 7 | 8 |
| Ink | Pigment dispersion | P-1 | 6.0 |  |  | 5.0 | 5.0 | 5.0 | 5.0 | 5.0 | 5.0 | 5.0 | 5.0 |
|  |  | P-2 |  | 5.0 |  |  |  |  |  |  |  |  |  |
|  |  | P-3 |  |  | 2.5 |  |  |  |  |  |  |  |  |
|  |  | P-4 |  |  |  |  |  |  |  |  |  |  |  |
|  |  | P-5 |  |  |  |  |  |  |  |  |  |  |  |
|  |  | P-6 |  |  |  |  |  |  |  |  |  |  |  |
|  | Resin emulsion | EM-1 | 9.0 | 5.0 | 5.0 |  |  |  |  |  |  |  |  |
|  |  | EM-2 |  |  |  |  |  |  |  |  |  |  |  |
|  |  | EM-3 |  |  |  |  |  |  |  |  |  |  |  |
|  |  | EM-4 |  |  |  |  |  |  |  |  |  |  |  |
|  |  | EM-5 |  |  |  |  |  |  |  |  |  |  |  |
|  |  | EM-6 |  |  |  |  |  |  |  |  |  |  |  |
|  |  | EM-7 |  |  |  |  |  |  |  |  |  |  |  |
|  |  | EM-8 |  |  |  |  |  |  |  |  |  |  |  |
|  |  | EM-9 |  |  |  |  | 5.0 |  |  |  |  |  |  |
|  |  | EM-10 |  |  |  |  |  | 5.0 |  |  |  |  | 5.0 |
|  |  | EM-11 |  |  |  |  |  |  | 5.0 |  |  |  |  |
|  |  | EM-12 |  |  |  |  |  |  |  | 5.0 |  | 5.0 |  |
|  |  | EM-13 |  |  |  |  |  |  |  |  | 5.0 | 5.0 |  |
|  | Solvent | S-1 | 20.0 | 30.0 | 20.0 | 30.0 | 30.0 | 30.0 | 30.0 | 30.0 | 30.0 | 30.0 | 30.0 |
|  |  | S-2 |  | 5.0 |  |  |  |  |  |  |  |  |  |
|  |  | S-3 |  |  | 20.0 |  |  |  |  |  |  |  |  |
|  |  | S-4 | 10.0 | 5.0 |  |  |  |  |  |  |  |  |  |

TABLE 2-continued

| | | 1 | 2 | 3 | 4 | 5 | 6 | 7 | 8 | 9 | 10 | 11 |
|---|---|---|---|---|---|---|---|---|---|---|---|---|
| Amino alcohol | DMAE | | | | | | | | | 0.10 | 0.10 | |
| | AMP | | | | | | | | | | | |
| | OHPIZ | | | | | | | | | | | |
| | TEA | | | | | | | | | | | 0.50 |
| Surfactant | F-1 | 0.5 | | | 0.5 | 0.5 | 0.5 | 0.5 | 0.5 | 0.5 | 0.5 | 0.5 |
| | F-2 | | | 0.5 | | | | | | | | |
| | F-3 | 0.5 | 0.8 | 0.5 | | | | | | | | |
| Ion exchange water | | balance | balance | balance | balance | balance | balance | balance | balance | balance | balance | balance |
| Total | | 100.0 | 100.0 | 100.0 | 100.0 | 100.0 | 100.0 | 100.0 | 100.0 | 100.0 | 100.0 | 100.0 |
| Content of amino alcohol (%) | | 0.025 | 0.025 | 0.025 | 0.025 | 0 | 0 | 0 | 0 | 0 | 0 | 0.500 |
| Evaluation | pH stability | A | A | A | A | C | C | A | A | A | A | A |
| | Dispersion stability | AA | AA | AA | A | C | C | C | C | C | C | A |
| | Ejection stability | A | A | A | A | C | C | C | C | C | C | B |
| | Intermittent ejection stability | A | A | A | A | C | C | C | C | C | C | B |
| | Water resistance | A | A | A | C | A | A | C | C | C | C | C |
| | Solvent resistance | A | A | A | C | A | A | C | C | C | C | C |

Incidentally, the abbreviations that are described for the first time in Table 2 are as described below.
OHPIZ: hydroxyethylpiperazine
S-1: propylene glycol
S-2: 1,3-propanediol
S-3: diethylene glycol
S-4: glycerin
F-1: polyalkoxy polydimethylpolysiloxane based: polysiloxane based compound represented by General Formula (III) (SILFACE SAG503A (manufactured by Nissin Chemical Co., Ltd.))
F-2: 2,5,8,11-tetramethyl-6-dodecine-5,8-diolethoxylate (Dynol 604 (manufactured by Air Products and Chemicals, Inc.))
F-3: di-2-ethylhexylsulfosuccinate sodium; compound represented by General Formula (II) (New Call 291PG (manufactured by Nippon Nyukazai Co., Ltd.))

[Evaluation]

<Evaluation of pH Stability>

Each inkjet recording ink compositions of Examples and Comparative Examples was sealed in a glass bottle, which was then stored for 2 weeks at 60° C. The pH was measured before and after the storage and the evaluation was made.
(Standard for Evaluation of pH Stability)
A: Decrease in pH value after the storage was less than 1.0 compared to the initial value.
B: pH Value after the storage was decreased by 1.0 or more compared to the initial value, but the pH value after the storage was 7.0 or more.
C: pH Value after the storage was decreased by 1.0 or more compared to the initial value, and the pH value after the storage was lower than 7.

If the pH stability evaluation result is A, it is evaluated as excellent pH stability. Furthermore, when the pH stability evaluation result is B, it can be practically used without any problem.

<Evaluation of Dispersion Stability>

Similar to the above evaluation of pH stability, each inkjet recording ink compositions of Examples and Comparative Examples was sealed in a glass bottle, which was then stored for 2 weeks at 60° C. A state after the storage was evaluated.
(Standard for Evaluation of Dispersion Stability)
AA: Aggregates or precipitates were not shown even after the storage, and a change in viscosity was 5% or less.
A: Aggregates or precipitates were not shown even after the storage.
B: Slight aggregates or precipitates of 1 µm or less were shown after the storage, but it can be practically used without any problem.
C: Significant aggregates or precipitates of more than 1 µm were shown after the storage.

If the dispersion stability evaluation result is AA, A, or B, it is evaluated as excellent dispersion stability and practically usable without any problem.

<Evaluation of Ejection Stability>

Each inkjet recording ink composition of Examples and Comparative Examples was ejected continuously for 1 hour by using a printer provided with 720 dpi inkjet head for evaluation.
(Standard for Evaluation of Ejection Stability)
A: No ejection, distorted ejection, or ink scattering has occurred less than 10 times.
B: No ejection, distorted ejection, or ink scattering has occurred 10 times or more but less than 20 times.
C: No ejection, distorted ejection, or ink scattering has occurred 20 times or more.

If the ejection stability evaluation result is A or B, it is evaluated as excellent ejection stability and practically usable without any problem.

<Evaluation of Intermittent Ejection Property>

Each inkjet recording ink composition of Examples and Comparative Examples was ejected from every nozzle by using a printer provided with 720 dpi inkjet head. After remaining it untouched for 1 hour at 25° C., the ejection was performed again and that ejection state was evaluated.
(Standard for Evaluation of Intermittent Ejection Property)
A: Ejection was shown from every nozzle.
B: Nozzle with an occurrence of no ejection or distorted ejection was found, but it was all recovered by cleaning of 1 to 5 times.
C: Nozzle with an occurrence of no ejection or distorted ejection was found, and it took cleaning of 6 times or more until the recovery.

If the evaluation result of intermittent ejection property is A or B, it is evaluated as excellent intermittent ejection property and practically usable without any problem.

Incidentally, as for the aforementioned cleaning, an operation of wiping a nozzle surface after extruding an ink from a nozzle for 3 seconds at a pressure of 10 kPa·s was performed for each cleaning.

<Evaluation of Water Resistance>

Each inkjet recording ink composition of Examples and Comparative Examples was solid-printed on a coated paper (Mirror Coat Platinum, manufactured by OJI PAPER CO., LTD.) by using a 720 dpi inkjet head. After drying it for 3 minutes at 100° C., a test specimen was prepared. Part of the test specimen was immersed for 5 minutes in ion exchange water, and by observing with a naked eye the printed material before and after the immersion, the water resistance was evaluated.

(Standard for Evaluation of Water Resistance)

A: No change was shown in the printed material before and after immersion.

B: Slight change in glossiness or discoloration of the printed material was shown, but it was practically usable without any problem.

C: Color of the printed material was clearly faded.

If the evaluation result of water resistance is A or B, it is evaluated as excellent water resistance and practically usable without any problem.

<Evaluation of Solvent Resistance>

Similar to the above water resistance evaluation, test specimens of each of Examples and Comparative Examples were prepared. The test specimens were wiped with 30% methanol aqueous solution, and by observing with a naked eye the printed material before and after the wiping, the solvent resistance was evaluated.

(Standard for Evaluation of Solvent Resistance)

A: No change was shown in the print before and after wiping.

B: Slight change in glossiness or discoloration of the printed material was shown, but it was practically usable without any problem.

C: Color of the printed material was clearly faded.

If the evaluation result of solvent resistance is A or B, it is evaluated as excellent solvent resistance and practically usable without any problem.

[Summary of Results]

The ink composition of Comparative Examples 4 and 5 in which EM-12 or EM-13, that is, a resin having an acid value of 10 mg KOH/g or more, is used exhibited poor results for every evaluation item except pH stability. "A" for the pH stability evaluation is considered to be based on a little change in pH even when there is a change in the amine amount, as the acid value is high. There was still no improvement in each evaluation item even for the ink composition of Comparative Examples 6 and 7 in which EM-12 or EM-13 is used in combination with an amino alcohol.

The ink compositions of Comparative Examples 2 and 3, in which EM-10 or EM-11 containing ammonia as neutralizing amine for a resin emulsion is contained, exhibited poor pH stability. In this regard, it is considered to be caused by volatilization of ammonia during storage. It seems that, as the ink composition of Comparative Examples 2 and 3 has lower dispersion stability of a self-dispersion type pigment in accordance with pH change, the dispersion stability, ejection stability, and intermittent stability are deteriorated.

Meanwhile, the ink composition of Comparative Example 1 which contains the resin emulsion EM-9 using triethanolamine having a boiling point of more than 300° C. as a neutralizing amine for a resin emulsion exhibits excellent pH stability as it has no problem in terms of volatilization. However, the print using the ink composition of Comparative Example 1 exhibited poor water resistance and poor solvent resistance.

Comparative Example 8 in which the resin emulsion EM-10 containing ammonia was used in combination with triethanolamine exhibited improved pH stability compared to Comparative Example 2. However, the water resistance and solvent resistance were deteriorated. From those results, it is considered that, as the ammonia contained in a resin emulsion is volatilized, the amino alcohol present in the ink composition is introduced to the resin emulsion and stabilized therein.

All of the ink compositions of Examples 1 to 25 in which a resin having an acid value of less than 10 mg KOH/g and an amino alcohol having a boiling point of 100° C. or more and 300° C. or less were used in combination exhibited excellent dispersion stability, ejection stability, and intermittent ejection property. Furthermore, the printed materials produced by using the ink compositions were clearly shown to have excellent water resistance and solvent resistance.

As shown in Example 16 or 17, an improvement was clearly observed for each evaluation item according to combined use of an amino alcohol having a boiling point of 100° C. or more and 300° C. or less, even when the resin emulsion EM-10 or EM-11 containing ammonia was used.

From the comparison of Examples 1 and 9 to 12 with Example 13, it was clearly shown that excellent water resistance and excellent solvent resistance can be obtained in the present invention by using a self-dispersion type pigment.

From the results of Examples 20 to 25, it was clearly shown that the dispersion stability is further improved as the surfactant represented by General Formula (II) is used for the ink composition of the present invention.

The invention claimed is:

1. An inkjet recording ink composition comprising:
    a resin having an acid value of less than 10 mg KOH/g;
    an amino alcohol having a boiling point of 100° C. or more and 300° C. or less;
    a pigment; and
    a solvent,
    wherein the resin is in an emulsion state.

2. The inkjet recording ink composition according to claim 1,
    wherein at least part of acidic groups contained in the resin are neutralized by the amino alcohol; and the resin is in an emulsion state.

3. A method for producing an inkjet recording ink composition,
    wherein the inkjet recording ink composition contains a resin having an acid value of less than 10 mg KOH/g, an amino alcohol having a boiling point of 100° C. or more and 300° C. or less, a pigment, and a solvent, and wherein the resin is in an emulsion state,
    wherein the method comprises the steps of:
    preparing the resin emulsion by neutralizing at least part of acidic groups contained in the resin by the amino alcohol;
    and mixing the resin emulsion, the pigment, and the solvent.

4. An inkjet recording method comprising:
    printing by an inkjet method using the inkjet recording ink composition defined by claim 1.

5. The inkjet recording ink composition according to claim 1, wherein the solvent contains at least one solvent selected from an aqueous solvent and water.

6. The inkjet recording ink composition according to claim 1, wherein the resin is an acrylic resin.

7. The inkjet recording ink composition according to claim 1, wherein an amine value of the resin is 5 mg KOH/g or less.

8. The inkjet recording ink composition according to claim 1, wherein conductivity of the resin is 200 □S/cm or less.

9. The inkjet recording ink composition according to claim 1, wherein the acid value of the resin is 3 mg KOH/g or less.

10. The inkjet recording ink composition according to claim 1, wherein a content ratio of the amino alcohol relative to 100 parts by mass of the total amount of the ink composition is 0.001 part by mass or more and 0.565 part by mass or less.

11. The inkjet recording ink composition according to claim 1, wherein a glass transition temperature (Tg) of the resin is 10° C. or more.

12. The inkjet recording ink composition according to claim 1, wherein a glass transition temperature (Tg) of the resin is 19° C. or more.

13. The inkjet recording ink composition according to claim 1, wherein a number of the hydroxyl group in amino alcohol is 1.

14. The inkjet recording ink composition according to claim 1, wherein a boiling point of the amino alcohol is 100° C. or more and 200° C. or less.

15. The inkjet recording ink composition according to claim 6, wherein a monomer that constitutes the acrylic resin contains a monomer having an acidic group and a monomer not having an acidic group, and the monomer not having an acidic group is a (meth)acrylic acid ester monomer not having an acidic group.

16. The inkjet recording ink composition according to claim 6, wherein a monomer that constitutes the acrylic resin contains a monomer having an acidic group and a monomer not having an acidic group, and a content ratio of the monomer having a acidic group in the acrylic resin is, relative to 100 parts by mass of the total amount of monomers in the acrylic resin, 0.005 part by mass or more and 3 parts by mass or less, and a content ratio of the monomer not having an acidic group in the acrylic resin is, relative to 100 parts by mass of the total amount of monomers in the acrylic resin, 97 parts by mass or more 99.995 parts by mass or less.

* * * * *